US011989747B2

(12) United States Patent
Wilbert et al.

(10) Patent No.: US 11,989,747 B2
(45) Date of Patent: May 21, 2024

(54) SMART FEEDBACK SYSTEM

(71) Applicant: SAP SE, Walldorf (DE)

(72) Inventors: Anja Wilbert, Munich (DE); Sabrina Regler, Munich (DE); Erica Davis, Nuremberg (DE); Oliver Latka, Penzberg (DE); Alice Guenes, Fürstenfeldbruck (DE); Lars Gregori, Munich (DE); Ketaki Raut, Munich (DE); Valentin Vieriu, Munich (DE)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 16/985,741

(22) Filed: Aug. 5, 2020

(65) Prior Publication Data

US 2022/0044265 A1 Feb. 10, 2022

(51) Int. Cl.
*G06Q 30/00* (2023.01)
*G06F 21/32* (2013.01)
*G06Q 30/0203* (2023.01)
*G06Q 30/0282* (2023.01)
*G06Q 30/0601* (2023.01)
(Continued)

(52) U.S. Cl.
CPC ......... *G06Q 30/0203* (2013.01); *G06F 21/32* (2013.01); *G06Q 30/0282* (2013.01); *G06Q 30/0631* (2013.01); *G06Q 30/0643* (2013.01); *G06T 13/40* (2013.01); *H04W 4/80* (2018.02)

(58) Field of Classification Search
None
See application file for complete search history.

(56) References Cited

U.S. PATENT DOCUMENTS 7,908,554 B1 * 3/2011 Blattner ................. G06T 13/40
715/706
10,062,100 B2 * 8/2018 Alvarez ................. G06Q 50/01
10,095,888 B1 10/2018 Lee et al.
(Continued)

FOREIGN PATENT DOCUMENTS

CN 108471350 8/2018
WO 2017/147696 9/2017

OTHER PUBLICATIONS

Zheng Qin, "Introduction to E-commerce", 2009, Springer, springer. com (Year: 2009).*

(Continued)

*Primary Examiner* — Naeem U Haq
(74) *Attorney, Agent, or Firm* — Fish & Richardson P.C.

(57) ABSTRACT

Methods and systems are used for providing a traveling avatar in a smart feedback system (SFS). As an example, a user associated with a first interaction with the SFS from a first device at a first location is identified. A first visualization of a personalized avatar associated with the user is provided to the first device. A first personalized feedback request is provided to the first device during the first visualization. First feedback of the user captured by the first device is received in response to the first personalized feedback request. The user associated with a second interaction with the SFS from a second device at the first location is identified. A second visualization of the personalized avatar is provided to the second device. A second personalized feedback request is provided to the second device. Second feedback of the user captured by the second device is received.

18 Claims, 10 Drawing Sheets

(51) Int. Cl.
*G06T 13/40* (2011.01)
*H04W 4/80* (2018.01)

(56) References Cited

U.S. PATENT DOCUMENTS

| | | |
|---|---|---|
| 11,205,196 B1 | 12/2021 | Raviv |
| 2009/0313055 A1 | 12/2009 | Martin et al. |
| 2010/0010885 A1* | 1/2010 | Hill .................. G06Q 20/10 705/14.15 |
| 2010/0093317 A1* | 4/2010 | Ghotge ............. H04L 67/535 455/414.1 |
| 2015/0112826 A1* | 4/2015 | Crutchfield, Jr. .. G06Q 30/0623 705/26.1 |
| 2016/0078512 A1* | 3/2016 | Yopp .............. G06Q 30/0639 705/26.41 |
| 2017/0076011 A1 | 3/2017 | Gannon |
| 2018/0040044 A1* | 2/2018 | Mattingly ........ G06Q 30/0617 |
| 2018/0082296 A1 | 3/2018 | Brashers |
| 2018/0089736 A1* | 3/2018 | Raravi ................ H04L 67/22 |
| 2018/0234433 A1 | 8/2018 | Oberhauser et al. |
| 2019/0081865 A1 | 3/2019 | Schrupp et al. |
| 2019/0114689 A1* | 4/2019 | Wang ............... G06Q 30/0631 |
| 2019/0295306 A1* | 9/2019 | Weston .............. A63F 13/56 |
| 2020/0117818 A1 | 4/2020 | Latka et al. |
| 2020/0166991 A1 | 5/2020 | Aggarwal et al. |
| 2020/0202390 A1 | 6/2020 | Gregori et al. |
| 2022/0044266 A1 | 2/2022 | Latka et al. |

OTHER PUBLICATIONS

Vijay Mandeep; "Proximity Marketing: How Top Retail Brands Engage Users with Beacon Technology"; Apr. 11, 2019; https://blog.markgrowth.com/proximity-marketing-how-top-retail-brands-engage-users-withbeacon-technology-75867b41ab37 (Year: 2019).*
Non-Final Office Action issued in U.S. Appl. No. 16/985,753 dated Feb. 4, 2022, 24 pages.
U.S. Appl. No. 16/720,355, filed Dec. 19, 2019, Tufegdzic.
U.S. Appl. No. 16/985,753, filed Aug. 5, 2020, Latka et al.
Extended European Search Report issued in European Application No. 18199567.1 dated Jan. 17, 2019, 25 pages.
Extended European Search Report issued in European Application No. 19170046.7 dated Sep. 27, 2019, 10 pages.
Swan, "Blockchain: Blueprint for a new economy." O'Reilly Media, Inc. 2015., 149 pages.
Office Action in U.S. Appl. No. 16/985,753, dated Sep. 30, 2022, 16 pages.

* cited by examiner

SMART FEEDBACK SYSTEM

BACKGROUND

A participant may utilize a survey system to determine user preferences and provide feedback from a wide number of users to the participant. For example, a survey system may utilize an email to invite users to click on a link included in the email to participate in a particular survey. The survey may include questions that are intended to elicit answers and information about a particular area that the participant wants to learn about the user.

SUMMARY

The present disclosure describes a smart feedback system.

In an implementation, a computer-implemented method is used for providing a traveling avatar in a smart feedback system. A smart feedback system (SFS) stores a plurality of user profiles. Each user profile is associated with a corresponding user and a corresponding personalized avatar. A user of the plurality of users associated with a first interaction with the SFS from a first device at a first location remote from the SFS is identified. A first visualization of a personalized avatar associated with the user is provided to the first device based on a user profile associated with the user. A first personalized feedback request is provided to the first device during the first visualization of the personalized avatar. The first personalized feedback request includes a first set of feedback requests associated with a first offer associated with a first participant of a plurality of participants. First feedback of the user captured by the first device is received in response to the first personalized feedback request and associating the first feedback with the user profile. The user associated with a second interaction with the SFS from a second device at the first location is identified. A second visualization of the personalized avatar is provided to the second device. A second personalized feedback request is provided to the second device during the second visualization of the personalized avatar. The second personalized feedback request includes a second set of feedback requests associated with a second offer associated with a second participant of the plurality of participants. Second feedback of the user captured by the second device is received in response to the second personalized feedback request and associating the second feedback with the user profile. The first device is a smart display device associated with a retailer at the first location and the second device is a smart phone associated with the user at the first location. A location of the second device is determined by the first device based on a quick response (QR) code, an iBeacon, Bluetooth, and near-field communication (NFC). Identifying the user of the plurality of users associated with the first interaction with the SFS from the first device further comprises detecting, by the first device, the user using biometric recognition. Providing the first personalized feedback request to the first device is based on the user profile associated with the user. Providing the second personalized feedback request to the second device is based on the user profile. The first visualization of the personalized avatar has a similar appearance as the second visualization of the personalized avatar. Providing a first recommendation to the first device during the first visualization of the personalized avatar is based on the user profile and an analysis of the first feedback of the user captured by the first device. Providing a second recommendation to the second device during the second visualization of the personalized avatar is based on the user profile and an analysis of the second feedback of the user captured by the second device.

In another implementation, a computer-implemented method is used for providing user and multi-user smart feedback in a smart feedback system. A smart feedback system (SFS) stores a plurality of user profiles and a plurality of participant profiles. Each user profile is associated with a corresponding user and a corresponding personalized avatar. Each user profile comprises user information, device information, a set of interaction patterns, and a set of preferences. Each participant profile is associated with a corresponding participant. Each participant profile comprises participant information. A first personalized feedback request is provided to a first device during a first visualization of a first personalized avatar associated with a first user of the plurality of users provided to the first device based on a first user profile of the plurality of user profiles associated with the first user. The first personalized feedback request includes a first set of feedback requests associated with a first offer associated with a first participant of the plurality of participants. First feedback of the first user captured by the first device is received in response to the first personalized feedback request. The first feedback of the first user captured by the first device is analyzed based on the first user profile and the first personalized feedback request associated with the first offer associated with the first participant. A first recommendation is determined based on the first user profile, the analyzed first feedback of the first user, the first offer associated with the first participant, and a second user profile of the plurality of user profiles of an associated second user of the plurality of users. The first recommendation is provided to the first device during the first visualization of the first personalized avatar associated with the first user. A second recommendation is determined using a machine learning algorithm based on the first user profile, the analyzed first feedback of the first user, the first offer associated with the first participant, and the second user profile. The second recommendation is provided to a second device during a second visualization of a second personalized avatar associated with the associated second user based on the second user profile. Prior to determining the first recommendation, that the associated second user is associated with the first user is determined based on one or more of friendship between the associated second user and the first user or a second offer similar to the first offer associated with the second user profile. The second user profile associated with the associated second user including the set of interaction patterns and the set of preferences in the second user profile is updated using a machine learning algorithm based on the first user profile, the analyzed first feedback of the first user, the first offer associated with the first participant, and the second user profile of the associated second user. The first user profile associated with the first user including the set of interaction patterns and the set of preferences in the first user profile is updated using a machine learning algorithm based on the first user profile, the analyzed first feedback of the first user, the first offer associated with the first participant, and the second user profile of the associated second user. The first feedback of the first user captured by the first device comprises at least one of a tone of voice, a facial expression, a heart rate, an emotion, content of speech, a gesture, or content of a textual or written response. The analysis of the first feedback of the first user captured by the first device comprises mapping at least one of the tone of voice, the facial expression, the emotion, the content of speech, the gesture, or content of a textual or written response to meaning using a machine learning algorithm based on the first personalized feedback request, and the set of interaction patterns and the set of preferences in the first user profile associated with the first user. A contextual and actionable response is determined using a machine learning algorithm based on the first user profile, the analyzed first feedback of the first user, the first offer associated with the first participant, the set of preferences in the first user profile and the second user profile of the associated second user. The determined contextual and actionable response is provided to the first device.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, providing a personalized avatar to interact with a user while receiving personalized feedback requests and providing personalized feedback may allow the user to perceive the personalized avatar as a friend and lead the user to provide more complete and honest feedback. Second, the visualization of the personalized avatar on one or more devices at one or more locations of the user allow the perception of the personalized avatar as a friend may increase as the user interacts with the same personalized avatar on different devices and at different locations. Third, personalization of feedback requests associated with a particular offer associated with a particular participant provided to the user may further motivate the user to provide more valuable and personalized feedback because the personalization of the feedback requests may make them feel valued. Fourth, feedback captured by a device associated with the user in response to the personalized feedback requests based on one or more of a tone of voice, a facial expression, a heart rate, an emotion, content of speech, a gesture, or content of a textual or written response, enables the feedback to be analyzed in a much broader context than simple textual responses. Fifth, providing recommendations to the user based on the analyzed feedback captured by the device associated with the user and a set of interaction patterns and a set of user preferences associated with one or more other associated user allows the smart feedback system to provide more targeted and effective recommendations.

The details of one or more implementations of the subject matter of this specification are set forth in the detailed description, the claims, and the accompanying drawings. Other features, aspects, and advantages of the subject matter will become apparent to those of ordinary skill in the art from the detailed description, the claims, and the accompanying drawings.

DETAILED DESCRIPTION

Figure 1:
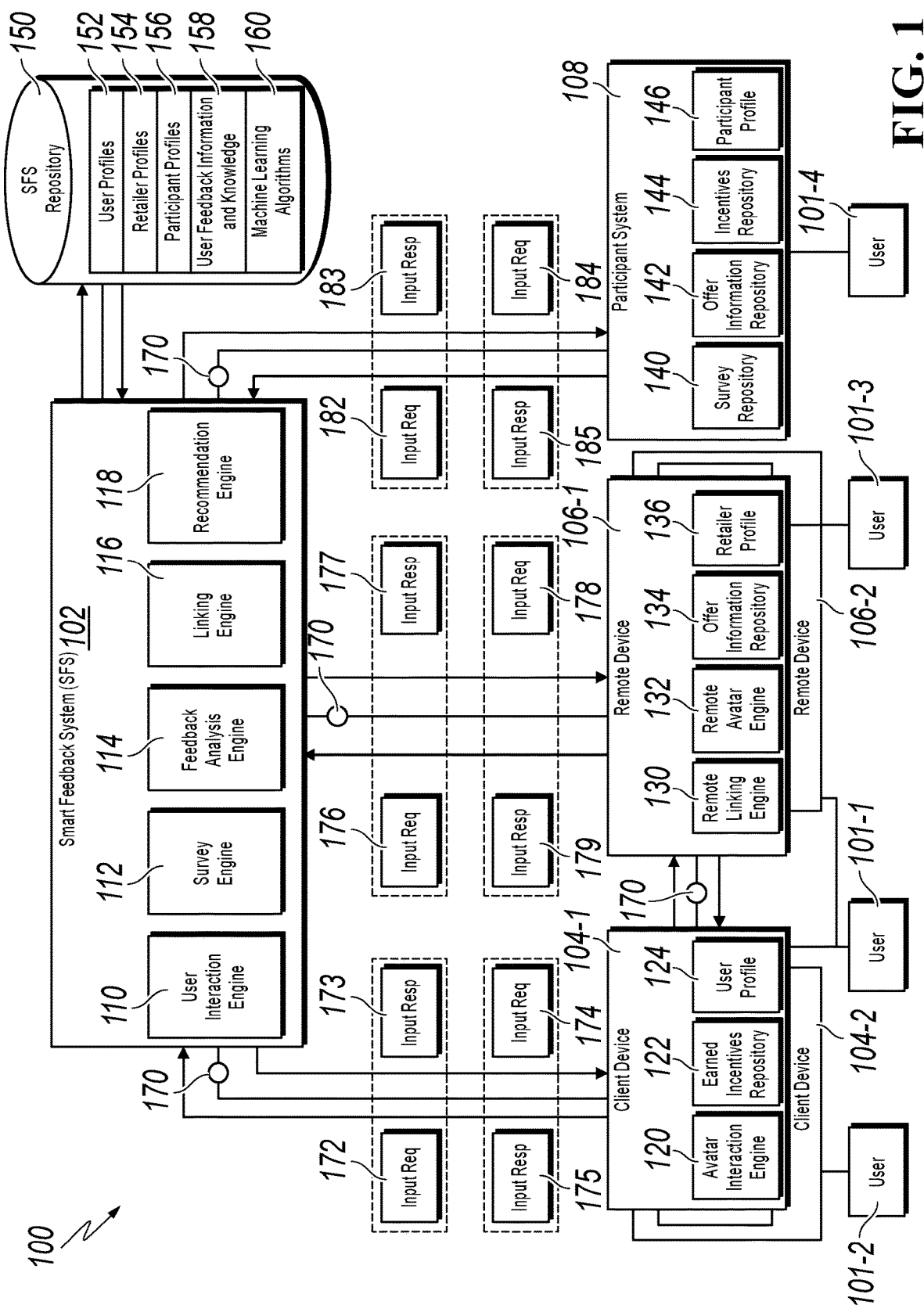
FIG. 1 is a block diagram illustrating an example distributed computing system (DCS) for providing a smart feedback system, according to an implementation of the present disclosure.

The following detailed description describes a smart feedback system, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Participants are people wanting feedback from their users, customers, or constituents. Participants may be, for example, retailers, advertisers, marketers, consumer researchers, designers, product planners, event planners, service providers, entertainment providers, sports franchises, brand managers, advocacy associations, survey firms, or other types of participants. A participant may utilize a survey system to determine user preferences and obtain feedback from a wide number of users that can then be provided to the participant. For example, a survey system may utilize an email to invite users to click on a link included in the email to participate in a particular survey. The survey may include questions that are intended to elicit answers and information about a particular area that the participant wants to learn about the user. In some cases, however, the questions in the survey may limit the information that can be gathered through the survey. Some of the users may not be motivated to share their opinion, which may impact the participation rate of the survey. Other users may participate in the survey, but may not answer all of the questions or may not provide their most honest and forthcoming answer do to the impersonal nature of survey, leading to lower completion rates of the survey by the users and a lower quality of answers that are provided. These issues may limit the value of a particular survey.

In contrast to a typical survey system, a smart feedback system (SFS) is disclosed herein. The SFS allows participants to know what their users think about their offers on-the-fly and at times and locations that are relevant and convenient to the user, which can increase user participation, interaction and perspective. An offer can be a brand, a product, a service, an experience, or a message associated with a particular participant. The SFS may also identify relationships between what a particular participant offers and how those offers are perceived by the users. In the SFS, the user is able to configure and personalize a personalized avatar and can interact with the SFS through the personalized avatar on any device associated with the system and/or the user, which may allow the user to perceive the personalized avatar as a friend or trusted advisor. In the SFS, the personalized avatar associated with the user may be visualized on one or more devices at one or more locations of the user, either on the user's own device or at one or more devices managed by or associated with the SFS. In this manner, the personalized avatar may travel with the user to the one or more locations at which the user is at, as well as to a device that is convenient to the user, with the user being able to interact with the SFS through or with the personalized avatar.

The one or more locations may include, for example, a retailer location, a terminal, a sports stadium, a user's home, among others. The SFS, through the personalized avatar, may asynchronously ping the user on a device to make a recommendation to the user or provide a personalized feedback request about a particular offer. The device may be associated with the user or the device may be an in-store device at a retailer location, or another device that the user may utilize, for example. The SFS may also make recommendations or provide personalized feedback requests that are synchronized with a particular action or event, such as the user being in close proximity to a remote device associated with a retailer or participant, the user making an inquiry through the personalized avatar about a particular offer or other offers the user may be interested in, or other actions or events. The device through which the user interacts with the personalized avatar may capture personalized feedback received in response to the personalized feedback request, and can transmit the captured personalized feedback to the SFS and its analytic systems for further analysis.

The SFS may analyze the captured personalized feedback using, for example, emotion recognition in video, facial emotion recognition in facial expressions from video, emotion recognition in audio, spoken expression from audio, emotion recognition in conversation from text, audio, or video, or a combination form, emotion recognition in text, emotion recognition from written expressions from text, and physiology as measured by wearable devices or other types of connected devices, tone of voice analysis, facial recognition, facial analysis, heart rate analysis, emotion analysis, content of speech analysis, gesture analysis, sentiment analysis, natural language processing (NLP), among others. The SFS may analyze the captured personalized feedback using a machine learning algorithm.

The SFS may provide a visualization of the analyzed captured personalized feedback to the device associated with the user during a visualization of the personalized avatar provided to the device. The visualization of the analyzed captured personalized feedback may show how the analyzed captured personalized feedback of the user resonates with other similar feedback captured and analyzed of one or more other users, how the analyzed captured personalized feedback of the user matters and impacts the overall feedback which was received by the SFS based on similar personalized feedback request of one or more other users. The SFS allows participants to provide feedback requests of what the participants want to know from their users. The SFS may provide the analyzed captured feedback from one or more users, which would allow the participants to improve the target audience group of their offers.

FIG. 1 is a block diagram illustrating an example distributed computing system (DCS) for providing a smart feedback system, according to an implementation of the present disclosure. At a high level, the illustrated DCS 100 includes or is made up of one or more communicably coupled computers or other components (see FIG. 8) that communicate across a network 170 (e.g., operating within a cloud-computing-based environment). The illustrated DCS 100 includes a smart feedback system (SFS) 102, client devices (also referred herein as mobile devices) 104 including client device 104-1 and client device 104-2, remote devices 106 including remote device 106-1 and remote device 106-2, a participant system 108, and a SFS repository 150. As illustrated, the SFS system 102 includes a user interaction engine 110, a survey engine 112, a feedback analysis engine 114, a linking engine 116, and a recommendation engine 118. Each illustrated client device 104 includes an avatar interaction engine 120, an earned incentives repository 122, and a user profile 124. As illustrated, each remote device 106 includes a remote linking engine 130, a remote avatar engine 132, an offer information repository 134, and a retailer profile 136, and the participant system 108 includes a survey repository 140, an offer information repository 142, an incentives repository 144, and a participant profile 146. Although the detailed description is focused on traveling avatar and user and multi-user smart feedback functionality, other functionality is envisioned to be covered by the described subject matter. Discussion of traveling avatar and user and multi-user smart feedback functionality is not intended to limit the detailed description in any way.

The SFS 102 allows a user to receive feedback requests associated with an offer associated with a participant, and to subsequently provide feedback through a personalized traveling avatar associated with the user on one or more devices at one or more locations. Further, the SFS 102 provides recommendations to the user through the personalized traveling avatar associated with the user based on a user profile associated with the user, an offer associated with a participant, and feedback of the user captured by the one or more devices at the one or more locations in response to a personalized feedback request. The recommendations provided by the SFS to the user may further be based on one or more other profiles associated with one or more other users associated with the user. For example, the association between the user and the one or more other associated users may be based on friendship. The SFS 102 may also provide recommendations to the one or more associated users through each of the one or more associated user's associated personalized traveling avatar based on the user profile associated with the user, the one or more profiles associated with the one or more other associated users, the offer associated with the participant, and feedback of the user captured by the one or more devices at the one or more locations in response to a personalized feedback request. The SFS 102 may be any computing device operable to connect to and/or communicate with at least the client devices 104, the remote devices 106, the participant system 108, and the SFS repository 150 (or components interfacing with any of these—whether illustrated or not).

As illustrated, the SFS 102 connects or interfaces to the client devices 104-1 and 104-2, the remote devices 106-1 and 106-2, and the participant system 108. In other instances, the SFS 102 may connect to a plurality of client devices 104, a plurality of remote devices 106, and a plurality of participant systems 108, where appropriate. In general, the SFS 102 comprises an electronic computing device operable to receive, transmit, process, and store any appropriate data associated with the DCS 100. In a number of embodiments, the SFS 102 may be a component of a centralized smart feedback system, a cloud smart feedback system, a cloud smart feedback operation cockpit, an application, or a smart feedback application, or comprise a centralized smart feedback system, a cloud smart feedback system, a cloud smart feedback operation cockpit, an application, or a smart feedback application.

Each client device 104 may be associated with a corresponding user and can be used to interact with the SFS 102 and to personalize or interact with a personalized traveling avatar associated with the corresponding user. Each client device 104 may also be used to receive personalized feedback requests associated with the corresponding user associated with an offer associated with a participant and to provide feedback in response to the personalized feedback requests. Further, each client device 104 may be used to receive recommendations based on the user profile associated with the corresponding user, one or more profiles associated with the one or more other associated users, the offer associated with the participant, and the feedback of the corresponding user captured by one or more devices at one or more locations in response to the personalized feedback requests associated with the corresponding user. Each client device 104 can also be used to interact with the SFS 102 to provide and maintain a user profile 152 of a plurality of user profiles 152 of the corresponding user at the SFS repository 150, and to retrieve the user profile 152 associated with the corresponding user and maintain the user profile 124 at the client device 104. Further, each client device 104 can also be used to interact with a particular remote device 106 to identify the corresponding user of the client device 104 to the particular remote device 106 or interact with the personalized traveling avatar associated with the corresponding user on the particular remote device 106. Each client device 104 may be any computing device operable to connect to and/or communicate with at least the SFS 102, the user interaction engine 110, the survey engine 112, the feedback analysis engine 114, the linking engine 116, the recommendation engine 118, the remote devices 106-1 and 106-2, the remote linking engine 130, the remote avatar engine 132, the offer information repository 134, and/or the retailer profile 136 (or components interfacing with any of these—whether or not illustrated).

In general, each client device 104 comprises an electronic computing device operable to receive, transmit, process, and store any appropriate data associated with the DCS 100. There may be any number of client devices 104 associated with, or external to, the DCS 100.

Similar to a client device 104, a user may utilize a particular remote device 106 to provide similar functionality between the user and the SFS 102. A particular remote device 106 can also be used by another user, such as a retailer user, to interact with the SFS 102 to provide and maintain a retailer profile 154 of a retailer at the SFS repository 150, to retrieve and maintain offer information of one or more participants associated with the retailer in the offer information repository 134, and to retrieve the retailer profile 154 associated with the retailer and maintain the retailer profile 136 at the particular remote device 106. Each remote device 106 may be any computing device operable to connect to and/or communicate with at least one of the SFS 102, the user interaction engine 110, the survey engine 112, the feedback analysis engine 114, the linking engine 116, the recommendation engine 118, each client device 104, the avatar interaction engine 120, the earned incentives repository 122, or the user profile 124 (or components interfacing with any of these—whether or not illustrated).

In general, each remote device 106 comprises an electronic computing device operable to receive, transmit, process, and store any appropriate data associated with the DCS 100. There may be any number of remote devices 106 associated with, or external to, the DCS 100.

The participant system 108 can be used by a participant user to interact with the SFS 102 to provide and maintain a participant profile 156 of a plurality of participant profiles 156 of a participant at the SFS repository 150. Each participant profile 156 may include survey information, offer information, incentives information, and rules of or associated with a participant. The participant system 108 can also be used to maintain synchronization of the survey information stored at the survey repository 140, the offer information stored at the offer information repository 142, and the incentives information stored at the incentives repository 144. The participant system 108 can be used to retrieve the participant profile 156 associated with the participant and maintain the participant profile 146 at the participant system 108. The participant system 108 may be any computing device operable to connect to and/or communicate with at least one of the SFS 102, the survey engine 112, the feedback analysis engine 114, the linking engine 116, or the recommendation engine 118 (or components interfacing with any of these—whether or not illustrated).

In general, the participant system 108 comprises an electronic computing device operable to receive, transmit, process, and store any appropriate data associated with the DCS 100. There may be any number of participant system 108 associated with, or external to, the DCS 100.

The SFS repository 150 may include a plurality of user profiles 152, where each user profile 152 of the plurality of user profiles 152 is associated with a corresponding user of a plurality of users and a corresponding personalized avatar. Each user profile 152 of the plurality of user profiles 152 may include user information, device information, a set of interaction patterns, and a set of preferences, among others. The user information may include, for example, a user name, a user identification (ID), a unique avatar ID associated with the personalized avatar, an age of the user, a gender of the user, or other user identifying features, among others. The device information may include a list of devices associated with the user, where each device in the list of devices may include, for example, a device name, a device ID, and an address associated with the device, among others. Each interaction pattern of the set of interaction patterns may include, for example, a type of interaction pattern, an offer associated with a participant associated with an interaction with the personalized avatar, a learned behavior of the user based on an analysis of feedback captured by a device associated with the user in response to a feedback request during the interaction with the personalized avatar based on the feedback request associated with the offer, and a machine learning algorithm, among others. Each preference of the set of preferences may include, for example, a type of preference, an offer associated with a participant associated with an interaction with the personalized avatar, a learned preference of the user based on an analysis of feedback captured by a device associated with the user in response to a feedback request during the interaction with the personalized avatar based on the feedback request associated with the offer, and a machine learning algorithm, among others.

The SFS repository 150 may also include a plurality of retailer profiles 154. Each retailer profile 154 may include retailer information, device information, and offer information, among others. The retailer information may include, for example, a retailer name, a retailer identification (ID), and a retailer location associated with the retailer, among others. The device information may include a list of devices associated with the retailer. The offer information may include, for example, a list of offers associated with the retailer. Each offer of the list of offers may be associated with a particular participant of a plurality of participants. Each offer may include offer details, such as, a price, a size, or a color, among others. Each offer may comprise a brand, a product, a service, an experience, or a message associated with a particular participant.

The SFS repository 150 may also include a plurality of participant profiles 156, where each participant profile 156 is associated with a corresponding participant of the plurality. Each participant profile 156 may include participant information, device information, survey information, offer information, and incentives information, among others. The participant information may include, for example, a participant name, a participant brand, a participant identification (ID), and a participant location associated with the participant, among others. The device information may include a list of devices associated with the participant. The survey information may include, for example, a set of feedback requests associated with a particular offer, a set of questions associated with a particular offer, among others. The offer information may include, for example, a list of offers associated with the participant, among others. The incentives information may include, for example, a discount incentive, a monetary incentive, a coupon incentive, an improved experience incentive, an improved recommendation incentive, a ratings incentive, a feedback incentive, among others.

The SFS repository 150 may also include user feedback information and knowledge 158, which may include analyzed user feedback and knowledge of one or more users of the plurality of users associated with corresponding user profiles 152 of the plurality of user profiles 152.

The SFS repository 150 may also include a plurality of machine learning algorithms 160, where each machine learning algorithm 160 may be associated with a particular analysis performed by the SFS 102.

The SFS repository 150 may further comprise a database and a set of database access functions. The SFS repository 150 may organize and store the plurality of user profiles 152, the plurality of retailer profiles 154, the plurality of participant profiles 156, the user feedback information and knowledge 158, and the plurality of machine learning algorithms 160 in the database as an indexed data structure. The indexed data structure may comprise a hypercube structure, or another appropriate data structure. The SFS repository 150 may also allow the data in the SFS repository 150 to be searched, updated, retrieved, and/or accessed using other database access functionality.

The SFS repository 150 may comprise a relational database, for example, a SAP HANA in-memory, column-oriented, relational database management system, a Microsoft SQL server relational database management system, an open data protocol (OData) based database, a representational state transfer (REST) based database, or any other suitable type of database system.

In an example embodiment, during operation at initialization time, configuration time, or registration time, the user interaction engine 110 may receive a registration input request 172 including, for example, user information associated with a user 101, such as, the user 101-1, and device information associated with the user 101-1. The user interaction engine 110 may perform an add user process to determine whether the user name and the user ID of the user information associated with the particular user 101-1 matches at least one of a user name and a user ID stored at a particular user profile of the plurality of user profiles 152 in the SFS repository 150. If the user name and the user ID of the user information associated with the particular user 101-1 do not match the user name and the user ID stored at a particular user profile of the plurality of user profiles 152, the user interaction engine 110 may, among other actions: generate a personalized avatar including a unique avatar ID associated with the personalized avatar, generate a new user profile associated with the particular user 101-1 including the unique avatar ID associated with the personalized avatar, the user information, and the device information associated with the particular user 101-1, add the generated new user profile associated with the particular user 101-1 to the plurality of user profiles 152 in the SFS repository 150, generate an input response 173 including the new user profile associated with the particular user 101-1, and/or transmit the input response 173 to the client device 104-1. The client device 104-1 may store the new user profile associated with the particular user 101-1 in the received input response 173 at the user profile 124. In a similar manner, one or more other users 101 may be added to the plurality of user profiles 152 in the SFS repository 150, where the particular user 101-1 and the one or more other users 101 may represent all of the active users within the SFS repository 150 associated with the SFS 102.

Further, the user interaction engine 110 may receive an avatar personalization input request 172 including the user information and the unique avatar ID associated with the personalized avatar. The user interaction engine 110 may initiate an avatar personalization process between the client device 104-1 associated with the user 101-1 and the user interaction engine 110 to allow the personalized avatar associated with the unique avatar ID to be configured and personalized by the user 101-1 based on configuration and personalization information associated with the user 101-1 received from the client device 104-1. In a similar manner, one or more other users 101 may configure and personalize the corresponding personalized avatar associated with the corresponding unique avatar ID.

In an example embodiment, during operation at initialization time, configuration time, maintenance time, or update time, the user interaction engine 110 may receive a configuration input request 176 including, for example, retailer information associated with a retailer associated with a user 101, such as the user 101-3, device information associated with the retailer associated with the user 101-3, and offer information associated with the retailer associated with a user 101-3. The user interaction engine 110 may perform an add retailer process to determine whether the retailer name and the retailer ID of the retailer information associated with the particular retailer associated with user 101-3 matches at least one of a retailer name and a retailer ID stored at a particular retailer profile of the plurality of retailer profiles 154 in the SFS repository 150. If the retailer name and the retailer ID of the retailer information associated with the particular retailer associated with the user 101-3 do not match the retailer name and the retailer ID stored at a particular retailer profile of the plurality of retailer profiles 154, the user interaction engine 110 may, among other actions: generate a new retailer profile associated with the particular retailer associated with the user 101-3 including the retailer information, the device information, and the offer information associated with the retailer associated with the user 101-3, add the generated new retailer profile associated with the retailer associated with the user 101-3 to the plurality of retailer profiles 154 in the SFS repository 150, generate an input response 177 including the new retailer profile associated with the retailer associated with the user 101-3, and/or transmit the input response 177 to a particular remote device 106. The particular remote device 106 may store the new retailer profile associated with the retailer associated with the user 101-3 in the received input response 177 at the retailer profile 136.

If the retailer name and the retailer ID of the retailer information associated with the particular retailer associated with the user 101-3 matches the retailer name and the retailer ID stored at a particular retailer profile of the plurality of retailer profiles 154, the user interaction engine 110 may, among other actions: update the particular retailer profile of the plurality of retailer profiles 154 associated with the particular retailer associated with the user 101-3 including new retailer information, new device information, and new offer information associated with the retailer associated with the user 101-3 and generate an input response 177 including the updated retailer profile associated with the retailer associated with the user 101-3, and transmit the input response 177 to the particular remote device 106. The particular remote device 106 may store the updated retailer profile associated with the retailer associated with the user 101-3 in the received input response 177 at the retailer profile 136. In a similar manner, one or more other retailers associated with one or more corresponding users 101 may be added to the plurality of retailer profiles 154 in the SFS repository 150, where the particular retailer associated with the user 101-3 and the one or more other retailers associated with the one or more other users 101 may represent all of the active retailers within the SFS repository 150 associated with the SFS 102.

In an example embodiment, during operation at initialization time, configuration time, maintenance time, or update time, the user interaction engine 110 may receive a configuration input request 182 including, for example, participant information associated with a participant associated with a user 101, such as the user 101-4, device information associated with the participant associated with the user 101-4, survey information associated with the participant associated with the user 101-4, offer information associated with the participant associated with the user 101-4, and incentives information associated with the participant associated with the user 101-4.

The user interaction engine 110 may perform an add participant process to determine whether the participant name and the participant ID of the participant information associated with the particular participant associated with user 101-4 matches at least one of a participant name and a participant ID stored at a particular participant profile of the plurality of participant profiles 156 in the SFS repository 150. If the participant name and the participant ID of the participant information associated with the particular participant associated with the user 101-4 do not match the participant name and the participant ID stored at a particular participant profile of the plurality of participant profiles 156, the user interaction engine 110 may, among other actions: generate a new participant profile associated with the particular participant associated with the user 101-4 including the participant information, the device information, the survey information, the offer information, and the incentives information associated with the participant associated with the user 101-4, add the generated new participant profile associated with the participant associated with the user 101-4 to the plurality of participant profiles 156 in the SFS repository 150, generate an input response 183 including the new participant profile associated with the participant associated with the user 101-4, and transmit the input response 183 to the participant system 108. The participant system 108 may store the new participant profile associated with the participant associated with the user 101-3 in the received input response 183 at the participant profile 146.

If the participant name and the participant ID of the participant information associated with the particular participant associated with the user 101-4 matches the participant name and the participant ID stored at a particular participant profile of the plurality of participant profiles 156, the user interaction engine 110 may, among other actions: update the particular participant profile of the plurality of participant profiles 156 associated with the particular participant associated with the user 101-4 including new participant information, new device information, new survey information, new offer information, and new incentives information associated with the participant associated with the user 101-4 and generate an input response 183 including the updated participant profile associated with the participant associated with the user 101-4, and transmit the input response 183 to the participant system 108. The participant system 108 may store the updated participant profile associated with the participant associated with the user 101-4 in the received input response 183 at the participant profile 146. In a similar manner, one or more other participant associated with one or more corresponding users 101 may be added to the plurality of participant profiles 156 in the SFS repository 150, where the particular participant associated with the user 101-4 and the one or more other participant associated with the one or more other users 101 may represent all of the active participant within the SFS repository 150 associated with the SFS 102.

In an example embodiment, during operation at run time, the user 101, such as, the user 101-1 may login to the SFS 102 from the client device 104-1 at a first location. The first location may be the location of a first retailer where the user 101-1 is interested in shopping. The client device 104-1 may generate a login input request 172 including, for example, user information associated with the user 101-1 provided by the user 101-1, device information associated with client device 104-1 associated with the user 101-1, and the first location. The client device 104-1 may transmit the login input request 172 to the user interaction engine 110. The user interaction engine 110 may receive the login input request 172 as a first interaction with the SFS 102. The user interaction engine 110 may identify the user 101-1 of a plurality of users 101 as an identified user 101-1 associated with the first interaction with the SFS 102 from the client device 104-1 at the first location remote from the SFS 102.

The user interaction engine 110 may determine a first user profile of the plurality of user profiles 152 associated with the identified user 101-1 based on a set of identifying information associated with the identified user 101-1. The set of identifying information associated with the identified user 101-1 may include, for example, the user name or the user ID in the user information in the login input request 172. If the user name or the user ID of the user information in the login input request 172 associated with the user 101-1 matches the user name or the user ID stored at a particular user profile of the plurality of user profiles 152, the user interaction engine 110 may determine that the particular user profile is the determined first user profile.

The user interaction engine 110 may provide a first visualization of the personalized avatar to the client device 104-1 based on the determined first user profile and the unique avatar ID associated with the personalized avatar in the determined first user profile.

Further, a remote device 106, such as the remote device 106-1, may detect the client device 104-1 at the first location associated with the user 101-1. The remote device 106-1 may be at the first retailer at the first location of the first retailer. The remote device 106-1 may detect the client device 104-1 and determine the first location of client device 104-1 based on a quick response (QR) code, an iBeacon, Bluetooth, and near-field communication (NFC). Alternatively, the user 101-1 may login directly to the remote device 106-1 or may login indirectly using the client device 104-1 and communication between the client device 104-1 and the remote device 106-1. The remote device 106-1 may also detect the user 101-1 using biometric recognition, such as facial recognition, eye iris scanning or iris recognition, or other types of biometric recognition.

The remote device 106-1 may generate a detection input request 176 including, for example, user information associated with the user 101-1 provided by the user 101-1 or by the client device 104-1 associated with the user 101-1, device information associated with the remote device 106-1, or the first location. The remote device 106-1 may transmit the detection input request 176 to the user interaction engine 110. The user interaction engine 110 may receive the detection input request 176 as a second interaction with the SFS 102. The user interaction engine 110 may identify the user 101-1 as the identified user 101-1 associated with the second interaction with the SFS 102 from the remote device 106-1. As previously described, the user interaction engine 110 may determine the first user profile of the plurality of user profiles 152 associated with the identified user 101-1 based on the user name or the user ID in the user information in the detection input request 176.

The user interaction engine 110 may provide a second visualization of the personalized avatar associated with the identified user 101-1 to the remote device 106-1 based on the identified user 101-1 associated with the second interaction with the SFS 102 from the remote device 106-1 at the first location.

The remote device 106-1 may detect an offer associated with a first participant of the plurality of participants. The remote device 106-1 may detect the offer associated with the first participant based on a QR code of the offer presented to the remote device 106-1. Alternatively, or in addition to the QR code of the offer, the remote device 106-1 may capture an image of the user 101-1 and the offer captured by the remote device 106-1. The remote device 106-1 may generate an image input request 176 including, for example, participant information associated with the first participant, the QR code of the offer associated with the first participant or the captured image of the user 101-1 and the offer, among others. The remote device 106-1 may transmit the image input request 176 to the user interaction engine 110.

The user interaction engine 110 may receive the image input request 176. The user interaction engine 110 may identify the offer associated with the first participant based on, for example, the participant information associated with the first participant, the QR code of the offer or the captured image of the user 101-1 and the offer in the image input request 176. The user interaction engine 110 may determine the offer associated with the first participant based on, for example, participant information associated with the first participant or the QR code of the offer in the image input request 176. Alternatively, the user interaction engine 110 may determine the offer associated with the first participant by recognizing the offer in the image of the user 101-1 and the offer captured by the remote device 106-1 using an image recognition algorithm and/or a machine learning algorithm of the plurality of the plurality of machine learning algorithms. The user interaction engine 110 may determine the first participant profile associated with the offer associated with the first participant based on the participant information associated with the first participant in the image input request 176, as previously described.

The survey engine 112 may generate a first personalized feedback request 174 based on the first user profile of the plurality of user profiles 152 associated with the identified user 101-1. The first personalized feedback request 174 may include, for example, a first set of feedback requests associated with the first offer and the first participant based on the determined first participant profile. The user interaction engine 110 may provide the generated first personalized feedback request 174 to the client device 104-1 during the first visualization of the first personalized avatar. Alternatively, the user interaction engine 110 may provide the generated first personalized feedback request 174 to the remote device 106-1 during the second visualization of the first personalized avatar.

The client device 104-1 may receive the first personalized feedback request 174 and the user interaction engine 110 may receive first feedback response 175 of the user 101-1 as received first feedback response 175 of the user 101-1 from the client device 104-1 in response to the first personalized feedback request 174. In the alternative, the remote device 106-1 may receive the first personalized feedback request 174 and the user interaction engine 110 may receive the first feedback response 175 of the user 101-1 as the received first feedback response 175 of the user 101-1 from the remote device 106-1. In one or more example embodiments, the client device 104-1 may be a smart phone associated with the user 101-1 and the remote device 106-1 may be a smart display device.

The interaction engine 110 may update the first user profile associated with the identified user 101-1 of the plurality of user profiles 152 at SFS repository 150 based on the first user profile and the received first feedback response 175 of the user 101-1.

The recommendation engine 118 may generate a recommendation input response 173 associated with the first location based on the first user profile associated with the identified user 101-1 and the received first feedback response 175 of the user 101-1. The interaction engine 110 may provide the generated recommendation input response 173 to the client device 104-1 during the first visualization of the first personalized avatar associated with the user 101-1. Alternatively, the interaction engine 110 may provide the generated recommendation input response 173 to the remote device 106-1 during the second visualization of the first personalized avatar.

The survey engine 112 may generate a second personalized feedback request 174 based on the first user profile of the plurality of user profiles 152 associated with the identified user 101-1. The second personalized feedback request 174 may include, for example, a second set of feedback requests associated with the first offer and the first participant based on the determined first participant profile. The user interaction engine 110 may provide the generated second personalized feedback request 174 to the client device 104-1 at a second location during a third visualization of the first personalized avatar provided to the client device 104-1 at the second location remote from the SFS 102 and different than the first location. The second location may be the location of a second retailer where the user 101-1 is interested in shopping. The user interaction engine 110 may identify the first user 101-1 associated with a third interaction with the SFS 102 from the client device 104-1 at the second location. The user interaction engine 110 may determine the first user profile of the plurality of profiles 152 at SFS 150 associated with the identified first user 101-1 based on the set of identifying information associated with the identified first user 101-1, as previously described. The user interaction engine 110 may provide a third visualization of the first personalized avatar associated with the identified first user 101-1 to the client device 104-1 based on the first user profile associated with the identified first user 101-1.

A remote device, such as the remote device 106-2, at the second retailer may detect the client device 104-1 at the second location. Based on user information provided to the SFS 102 by the remote device 106-2 from the detected client device 104-1, the user interaction engine 110 may identify the first user 101-1, determine the first user profile associated with the first user 101-1, and provide a fourth visualization of the first personalized avatar to the remote device 106-2 based on the first user profile.

The user interaction engine 110 may, for example, identify a second offer associated with a second participant of the plurality of participants 156 and the second location based on a video image of the second offer on the user 101-1 captured by the remote device 106-2. In another example, the user 101-1 may have provided a QR code of the second offer to the user interaction engine 110 via the remote device 106-2. In yet another example, the second offer associated with the second participant may have been provided to the remote device 106-2 by a recommendation provided by the recommendation engine 118 based on the previous feedback provided by the user 101-1, the first user profile, and the second location of the second retailer.

The survey engine 112 may generate a second personalized feedback request 174 based on the first user profile associated with the identified user 101-1. The second personalized feedback request 174 may include, for example, a second set of feedback requests associated with the second offer and the second participant based on a determined second participant profile of the plurality of participants 156. The user interaction engine 110 may provide the generated second personalized feedback request 174 to the client device 104-1 at the second location during the third visualization of the first personalized avatar provided to the client device 104-1 at the second location remote from the SFS 102 and different than the first location. Alternatively, the user interaction engine 110 may provide the generated second personalized feedback request 174 to the remote device 106-2 at the second location during the fourth visualization of the first personalized avatar provided to the remote device 106-2.

The user interaction engine 110 may receive second feedback response 175 of the user 101-1 as received second feedback of the first user 101-1 from the client device 104-1 in response to the generated second personalized feedback request 174. In the alternative, the user interaction engine 110 may receive the second feedback response 175 of the user 101-1 from the remote device 106-2.

The recommendation engine 118 may generate a second recommendation input response 173 associated with the second location based on the first user profile associated with the identified user 101-1, the received first feedback response 175 of the user 101-1, and the received second feedback response 175 of the user 101-1. The interaction engine 110 may provide the generated second recommendation input response 173 to the client device 104-1 during the third visualization of the first personalized avatar associated with the user 101-1.

In one or more example embodiments, the user 101-1 may login to the SFS 102 from any device that supports connection and avatar interactions with the SFS 102 at any location and the connection and the avatar interactions are not bound to a physical retailer location, a physical store, or another physical location of an entity. The connection and avatar interactions with the SFS 102 may be with a virtual store or a virtual entity, such as, an online retailer with a web site.

In an example embodiment, during operation at run time, the survey engine 112 may generate a first personalized feedback request 174 based on a first user profile of the plurality of user profiles 152 at SFS repository 150 associated with an identified first user 101-1. The first personalized feedback request 174 may include, for example, a first set of feedback requests associated with a first offer associated with a first participant of a plurality of participants. The user interaction engine 110 may provide the generated first personalized feedback request 174 to a client device 104-1 associated with the identified first user 101-1 during a first visualization of a first personalized avatar associated with the identified first user 101-1.

The user interaction engine 110 may receive first feedback of the identified first user 101-1 captured by the client device 104-1 in response to the generated first personalized feedback request 174. The feedback analysis engine 114 may analyze the received first feedback of the identified first user 101-1 captured by the client device 104-1 based on the first user profile associated with the identified first user 101-1 and the generated first personalized feedback request 174 associated with the first offer associated with the first participant.

The received first feedback of the identified first user 101-1 captured by the client device 104-1 may include, for example, a tone of voice, a facial expression, a heart rate, an emotion, content of speech, a gesture, or content of a textual or written response. The analysis by the feedback analysis engine 114 of the received first feedback of the identified first user 101-1 captured by the client device 104-1 may include, for example, mapping at least one of the tone of voice, the facial expression, the emotion, the content of speech, the gesture, or content of a textual or written response to meaning using a machine learning algorithm 160 of the plurality of machine learning algorithms 160 at SFS repository 150 based on the generated first personalized feedback request 174, and the set of interaction patterns and the set of preferences in the first user profile associated with the identified first user 101-1.

The recommendation engine 118 may determine a first recommendation based on the first user profile associated with the identified first user 101-1, the analyzed first feedback of the identified first user 101-1, the first offer associated with the first participant, and a second user profile of the plurality of user profiles 152 associated with an associated identified second user 101-2 of the plurality of users. Prior to determining the first recommendation, the recommendation engine 118 may determine that the identified second user 101-2 is associated with the identified first user 101-1 based on one or more of friendship between the identified second user 101-2 and the identified first user 101-1 or a second offer similar to the first offer associated with the second user profile associated with the identified second user 101-2. The interaction engine 110 may provide a first recommendation input response 173 including the determined first recommendation input response 173 to the client device 104-1 during the first visualization of the first personalized avatar associated with the identified first user 101-1.

The user interaction engine 110 may update the first user profile associated with the identified first user 101-1 including the set of interaction patterns and the set of preferences in the first user profile using a machine learning algorithm 160 of the plurality of machine learning algorithms 160 at SFS repository 150 based on the first user profile, the analyzed first feedback of the identified first user 101-1 captured by the client device 104-1, the first offer associated with the first participant, and the second user profile associated with the second user 101-2. The interaction engine 110 may also update the second user profile associated with the identified second user 101-2 including the set of interaction patterns and the set of preferences in the second user profile using the machine learning algorithm 160 based on the first user profile, the analyzed first feedback of the identified first user 101-1, the first offer associated with the first participant, and the second user profile associated with the second user 101-2.

The recommendation engine 118 may determine a second recommendation using a machine learning algorithm 160 based on the first user profile associated with the identified first user 101-1, the analyzed first feedback of the identified first user 101-1, the first offer associated with the first participant, and the second user profile associated with the identified second user 101-2. The user interaction engine 110 may provide the second recommendation to a second client device 101-2 associated with the identified second user 101-2 during a second visualization of a second personalized avatar associated with the associated identified second user 101-2 based on the second user profile associated with the associated identified second user 101-2.

The feedback analysis engine 114 may determine a contextual and actionable response 173 using a machine learning algorithm 160 based on the first user profile associated with the identified first user 101-1, the analyzed first feedback of the identified first user 101-1, the first offer associated with the first participant, the set of preferences in the first user profile, and the second user profile of the associated identified second user 101-2. The user interaction engine 110 may provide the determined contextual and actionable response 173 to the first client device 104-1 associated with the identified first user 101-1.

Figure 2A:
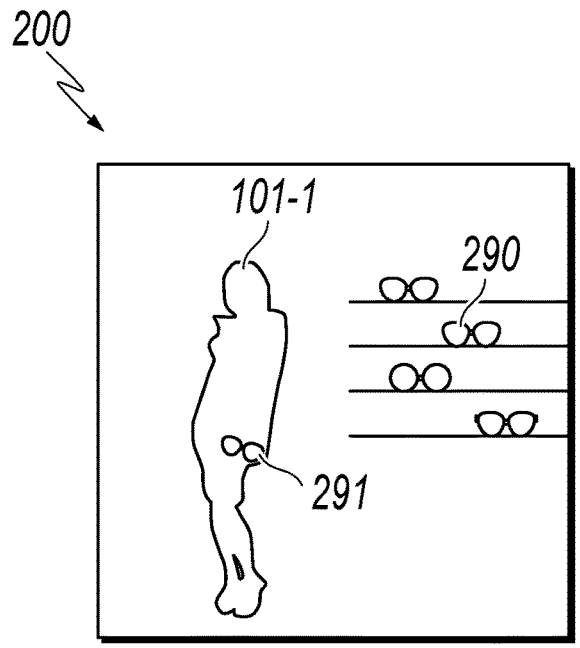
FIG. 2A is a conceptual diagram illustrating selection of items at a retailer location to initiate user interactions with a traveling avatar in a smart feedback system based on the selected items, according to an implementation of the present disclosure.

FIG. 2A is a conceptual diagram 200 illustrating selection of items at a retailer location to initiate user interactions with a traveling avatar in a smart feedback system based on the selected items, according to an implementation of the present disclosure. A user, such as user 101-1 (see FIG. 1), may visit a retailer at the retailer's location where various participants offer their products including sunglasses that the user is interested in. For example, the user 101-1 can select items, such as sunglasses 290 and 291, to try on. The user 101-1 may initiate user interactions with a traveling avatar in a smart feedback system.

Figure 2B:
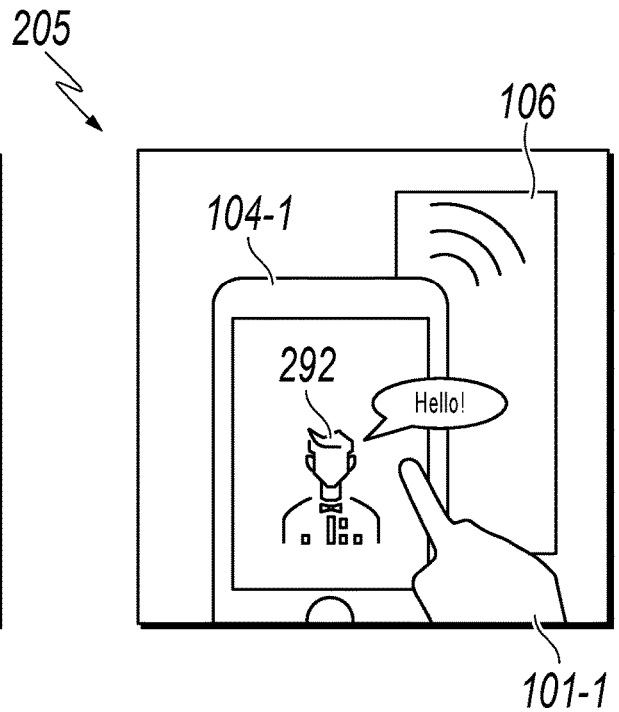
FIG. 2B illustrates an example user interface for initiating user interactions with a traveling avatar on a user device at the retailer location based on the selected items, according to an implementation of the present disclosure.

FIG. 2B illustrates an example user interface 205 for initiating user interactions with a traveling avatar on a user device at the retailer location based on the selected item, according to an implementation of the present disclosure. For example, the user 101-1 may start a traveling avatar application installed on a mobile device 104-1 (see FIG. 1). The retailer device, such as remote device 106, in the retailer may detect and connect to the user device 101-1 using an iBeacon, Bluetooth, NFC, or other types of short range communication. The user information including the user identification of the user 101-1 may be communicated by the user's mobile device 104-1 to the remote device 106 and then over a network to the SFS 102 to identify the user 101-1 to the SFS 102 and allow communication between the mobile device 104-1 and the remote device 106, for example. The remote device 106 may also communicate retailer information associated with the retailer at the remote device 106 over the network to the SFS 102 to identify the retailer to the SFS 102. A personalized avatar 292 associated with the user 101-1 may greet the user 101-1 on the mobile device 104-1.

Figure 2C:
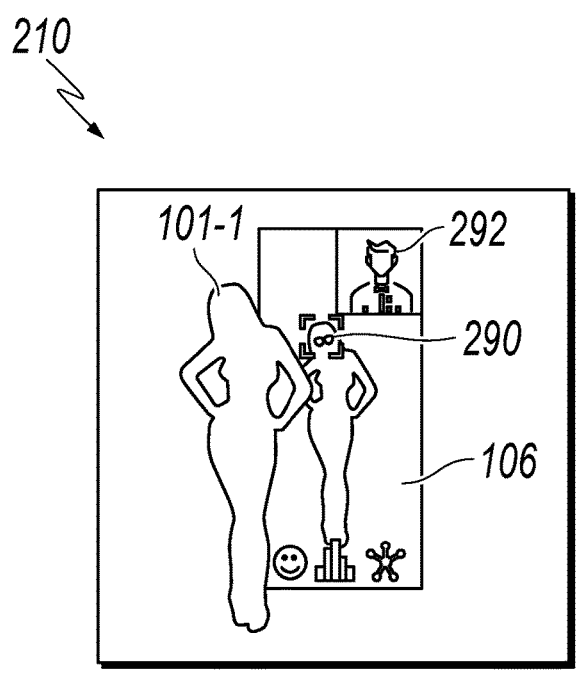
FIG. 2C illustrates another example user interface for initiating user interactions with the traveling avatar on a retailer device at the retailer location based on the selected items, according to an implementation of the present disclosure.

FIG. 2C illustrates another example user interface 210 for initiating user interactions with the traveling avatar on a retailer device at the retailer location based on the selected items, according to an implementation of the present disclosure. For example, the user 101-1 tries on the sunglasses 290 in front of the remote device 106 and may interact with the personalized avatar 292 provided on the remote device 106. As illustrated, the remote device 106 may be a smart display device that allows the user 101-1 to see themselves, see their personalized avatar 292 and other images, and may capture live video and audio of the user 101-1 and their surroundings. The remote device 106 may capture a live video image of the sunglasses 290 on the user 101-1 using a camera and a microphone of the remote device 106, which may then identify the particular sunglasses 290 using image recognition. The user 101-1 can provide feedback about the sunglasses 290 through the personalized avatar 292 to the SFS 102 through live video and audio captured by the remote device and visual artificial intelligence (AI), for example. The SFS 102 may analyze the feedback provide by the user 101-1 in real-time using one or more of image recognition on the captured video images, speech recognition on the captured audio, emotion recognition in audio to extract emotions from the captured audio including tone of voice and voice signals, emotion recognition in video to extract emotions from the captured video and audio, and gesture recognition from the captured gestures. The SFS 102 may provide results to the user 101-1 displayed in real-time on the remote device 106, such as the happy face or other images displayed toward the bottom of the smart display device, for example. As another example, the SFS 102 may provide results to the user 101-1 using verbal speech through the personalized avatar 292, for example. In yet another example, the interaction between the user 101-1 and the personalized avatar 292 may be in the form of conversation, where the personalized avatar 292 makes verbal requests for feedback and the user 101-1 provides the requested feedback verbally to the personalized avatar 292 along with all of the other non-verbal feedback that the user 101-1 provides during the conversation. Similarly, the user 101-1 may try on the second pair of sunglasses 291 in front of the remote device 106 (not shown) and the process may proceed in a similar manner to the process when the user tried on the first pair of sunglasses 290.

Figure 2D:
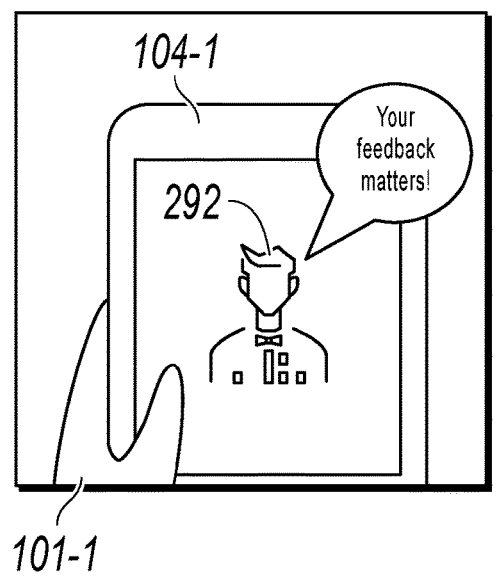
FIG. 2D illustrates an example user interface for providing an incentive to the user to increase their motivation to continue to provide feedback based on the selected items, according to an implementation of the present disclosure.

FIG. 2D illustrates an example user interface 215 for providing an incentive to the user to increase their motivation to continue to provide feedback based on the selected items, according to an implementation of the present disclosure. For example, the SFS 102 may provide an incentive to the user 101-1 through the personalized avatar 292 to motivate the user 101-1 to continue to provide feedback about the sunglasses 290 and 291 that the user 101-1 has taken home on a one week trial. As illustrated, the personalized avatar 292 provides the user 101-1 with an incentive that is a textual message that lets the user 101-1 know that their feedback matters and is valued by the retailer and the participant. The incentive may also be a verbal message or another type of incentive that is provided to the user 101-1 through the personalized avatar 292.

Figure 2E:
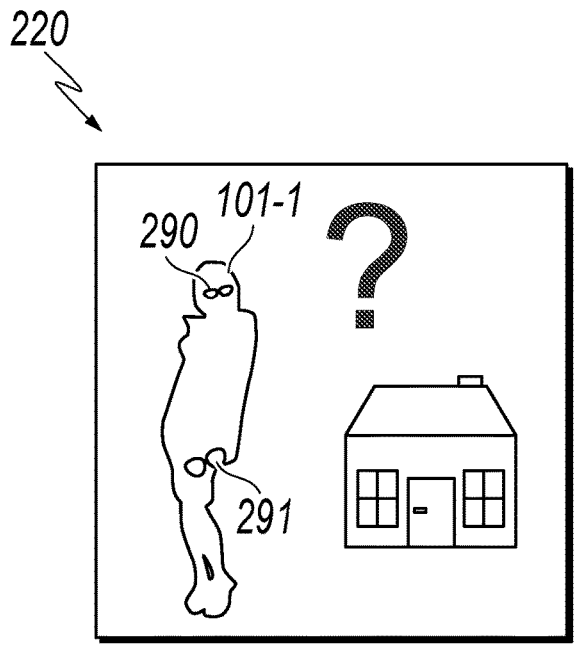
FIG. 2E is a conceptual diagram illustrating evaluation of items at a home location to initiate additional user interactions with the traveling avatar on a user device based on the selected items, according to an implementation of the present disclosure.

FIG. 2E is a conceptual diagram 220 illustrating evaluation of items at a home location to initiate additional user interactions with the traveling avatar on a user device based on the selected items, according to an implementation of the present disclosure. For example, the user 101-1 may evaluate both pairs of sunglasses 290 and 291 at the user's home to decide which sunglasses the user 101-1 likes better during the one week trial period. The user 101-1 may initiate user interactions with the traveling avatar 292 on a device at the location of the user's 101-1 home, for example.

Figure 2F:
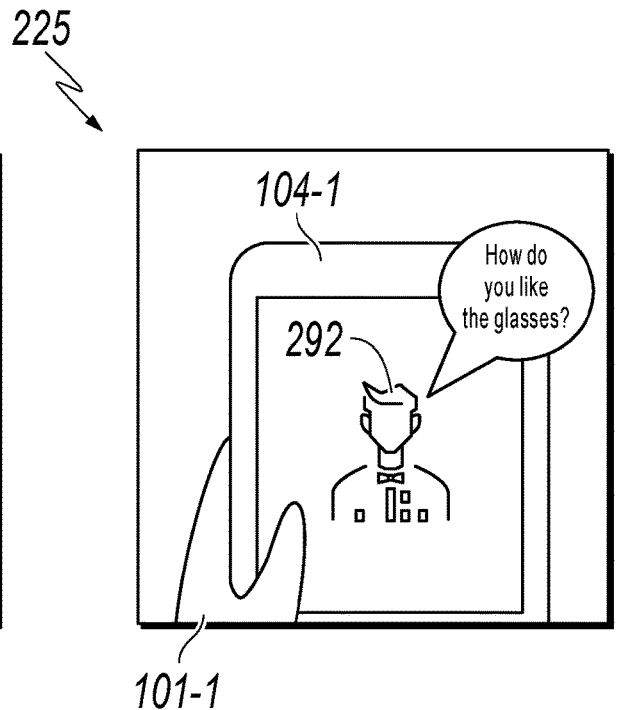
FIG. 2F illustrates the example user interface for the traveling avatar requesting additional feedback on the user device at the home location during the trial period based on the selected item, according to an implementation of the present disclosure.

FIG. 2F illustrates the example user interface for the traveling avatar requesting additional feedback on the user device at the home location based on the selected items, according to an implementation of the present disclosure. For example, the personalized avatar 292 may actively initiate a feedback request dialog with the user 101-1 when the user 101-1 has time to gather feedback from the user 101-1 before the one week trial period ends on the two pair of sunglasses 290 and 291. The traveling avatar application on the mobile device 104-1 may determine that the user 101-1 has recently been active and may be available for interaction with the personalized avatar 292, for example. The traveling avatar application may cause the personalized avatar 292 to be presented on the mobile device 104-1 and make feedback requests about how the user 101-1 likes the sunglasses 290 and 291, for example. The feedback requests may be a textual feedback request as illustrated. The feedback requests may also be a verbal feedback request, an animated feedback request, another type of feedback request, or a combination of different types of feedback requests.

Figure 2G:
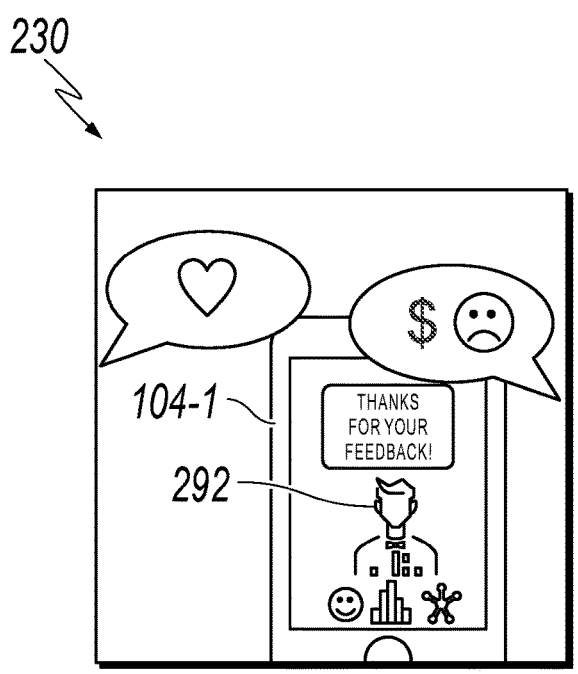
FIG. 2G illustrates the example user interface for user interactions providing feedback through the traveling avatar on the user device at the home location based on the selected item, according to an implementation of the present disclosure.

FIG. 2G illustrates the example user interface 230 for user interactions providing feedback through the traveling avatar on the user device at the home location based on the selected item, according to an implementation of the present disclosure. For example, in response to the feedback requests of FIG. 2F, the user 101-1 may try on the first pair of sunglasses 290 in front of the mobile device 104-1 and may interact with personalized avatar 292 provided on the mobile device 104-1. Similar to the interactions described with respect to the in-store remote device 106 in FIG. 2C, the mobile device 104-1 may capture live video and audio of the sunglasses 290 on the user 101-1 and feedback provided by the user 101-1 using a camera and a microphone of the mobile device 104-1, for example. The feedback provided by the user 101-1, such as verbal feedback, indicates that the user 101-1 likes the sunglasses 290 but that they are too expensive. The SFS 102 may analyze all of the captured video and audio feedback provided by the user 101-1 in real-time, as previously described with respect to FIG. 2C. The SFS 102 may provide the results of the analysis to the user 101-1 through the personalized avatar 292 and display them in real-time on the mobile device 104-1, such as the happy face and other images displayed toward the bottom of the display of the mobile device 104-1 as illustrated. As previously described, the interaction between the user 101-1 and the SFS 102 through the personalized avatar may be in the form of a textual conversation, a verbal conversation, or a live video and animation, and a verbal interaction, where the personalized avatar 292 makes requests for feedback and the user 101-1 provides the requested feedback verbally to the personalized avatar 292 along with all of the other non-verbal feedback that the user 101-1 provides during the conversation. Similarly, the user 101-1 may try on the second pair of sunglasses 291 in front of the mobile device 104-1 (not shown) and the request and feedback process may proceed in a similar manner to the process when the user tried on the sunglasses 290.

Figure 2H:
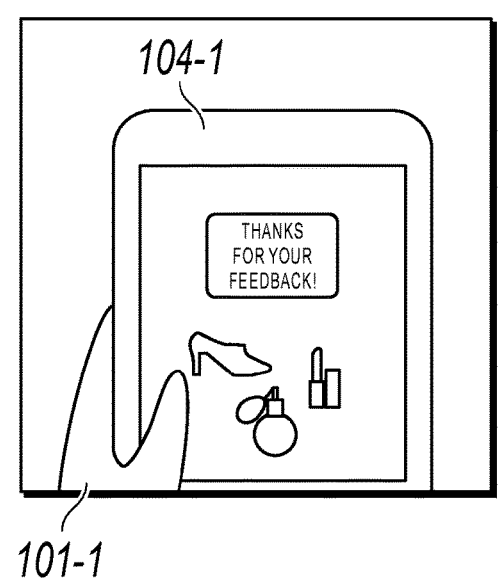
FIG. 2H illustrates the example user interface for the traveling avatar requesting feedback on other recommended items on the user device at another location based on the other recommended items, according to an implementation of the present disclosure.

FIG. 2H illustrates the example user interface 235 for the traveling avatar requesting feedback on other recommended items on the user device at another location based on the other recommended items, according to an implementation of the present disclosure. For example, based on the results of the analysis of the captured video and audio provided by the user 101-1 about the sunglasses 290 and 291, as previously described with respect to FIG. 2G, and patterns and preferences of the user 101-1 learned from past interactions and personal data provided by the user 101-1 to the SFS 102, the SFS 102 may provide personalized recommendations for other items that the user 101-1 may be interested in. The SFS 102 may provide the personalized recommendations for the other items, such as a pair of shoes, a lipstick, and a perfume, to the mobile device 104-1 for display. The personalized avatar 292 may make additional requests to provide feedback on the recommended items displayed on the mobile device 104-1, where the additional feedback requests may be provided in a textual message as illustrated, for example. The additional requests may be personalized to the user and may only include requests that the SFS 2 has not already learned about the user 101-1 based on the learned patterns and preferences of the user 101-1, for example. This may allow the user 101-1 to quickly and simply provide feedback in response to these personalized feedback requests. The other location may be, for example, another retailer's location that the user 101-1 is visiting where various other participants may offer their products including the recommended pair of shoes, the lipstick, and the perfume that the user 101-1 may be interested in. In another example, the retailer may be an online retailer's website and the user that the user 101-1 may be visiting from any location the user prefers where the recommended items are offered by the various other participants.

Figure 2I:
FIG. 2I illustrates the example user interface for user interactions providing feedback through the traveling avatar on the user device at the other location based on the other recommended items, according to an implementation of the present disclosure.

FIG. 2I illustrates the example user interface 240 for user interactions providing feedback through the traveling avatar on the user device at the other location based on the other recommended items, according to an implementation of the present disclosure. For example, in response to the feedback requests of FIG. 2H, the user 101-1 may provide feedback on the recommended items through interactions with the personalized avatar 292 on the mobile device 104-1, similar to the interactions described with respect to the mobile device 104-1 in FIG. 2G. The feedback provided by the user 101-1, such as verbal feedback, indicates that the user 101-1 loved some of the recommended items but did not like some of the other recommended items. As illustrated, based on the feedback provided on the recommended items, the SFS 102 through the personalized avatar 292 provides the user 101-1 with a textual or verbal message provide on the mobile device 104-1 to motivate the user 101-1 to continue to provide feedback, for example. The SFS 102 may provide the personalized analyzed feedback gathered from the user 101-1 and other information associated with the user 101-1 and the associated offers to the participants. The participants may receive this information associated with the user 101-1 as part of learning about their users and customers. In response to receiving this information about the user 101-1, the participants may provide a personalized reward incentive to the user 101-1, such as, personalized loyalty credits that may be deposited in a loyalty account associated with the user 101-1 as shown by an image of a coin being deposited in a piggy bank displayed on the mobile device 104-1.

Figure 2J:
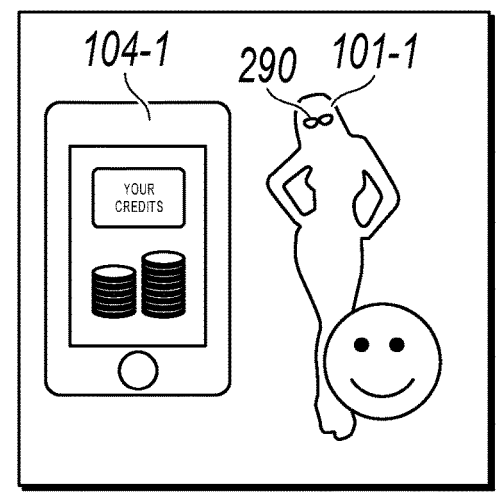
FIG. 2J illustrates the example user interface for the traveling avatar providing incentives on the user device based on user feedback provided on participants offers overtime, according to an implementation of the present disclosure.

FIG. 2J illustrates the example user interface 245 for the traveling avatar providing incentives on the user device based on user feedback provided on participants offers overtime, according to an implementation of the present disclosure. For example, the user 101-1 may inquire about the amount of loyalty credits in the loyalty account associated with the user 101-1 through the personalized avatar 292. The SFS 102 may provide the amount of loyalty credits that the user 101-1 has through the personalized avatar 292 on the mobile device 104-1, for example. As illustrated, the user 101-1 learns that they have collected enough loyalty credits to purchase the sunglasses 290 and buys the new sunglasses 290 from the retailer described in FIG. 2A.

Figure 3:
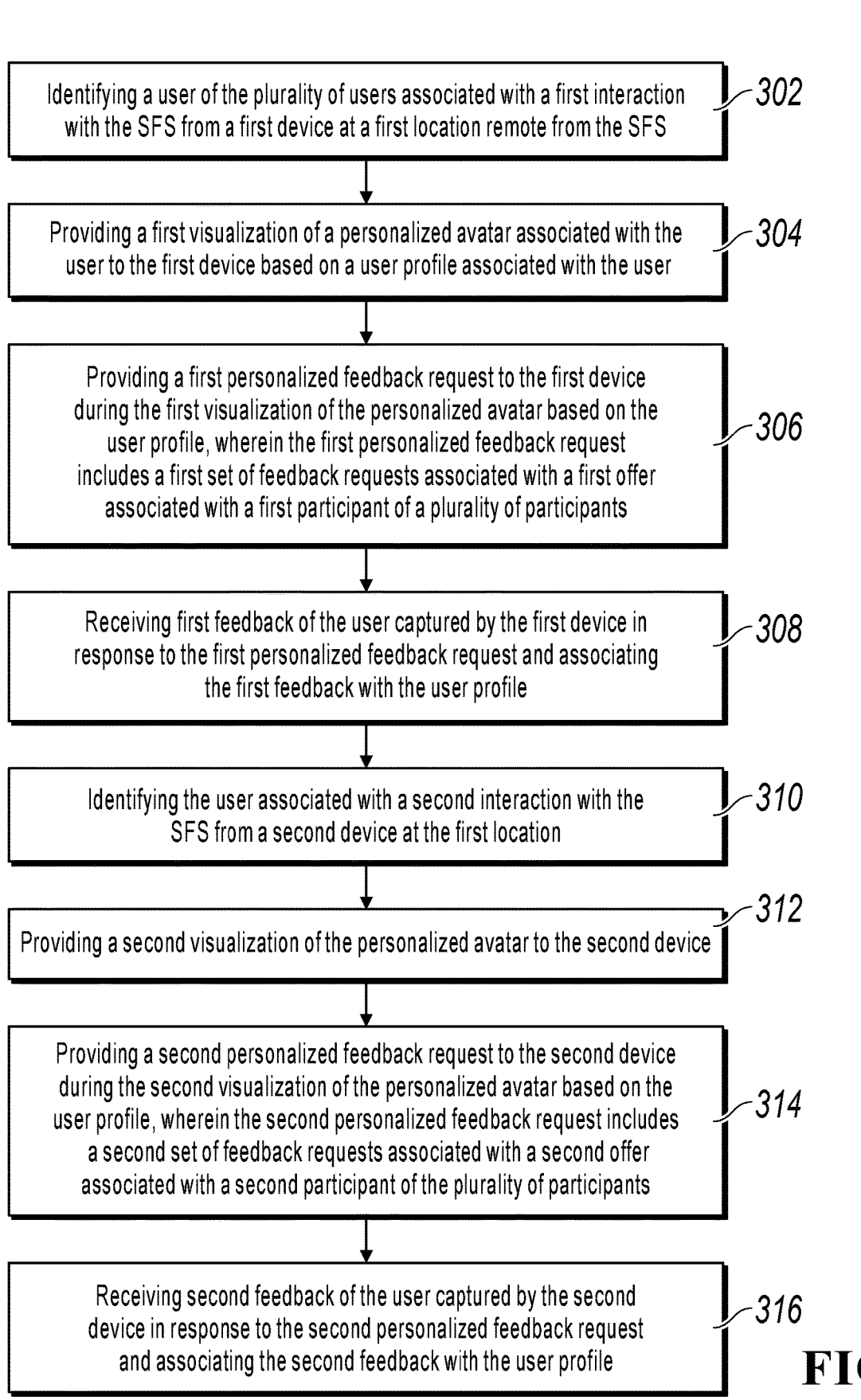
FIG. 3 is a flowchart illustrating an example of a computer-implemented method for providing a traveling avatar in a smart feedback system, according to an implementation of the present disclosure.

FIG. 3 is a flowchart illustrating an example of a computer-implemented method 300 for providing a traveling avatar in a smart feedback system, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

The method 300 is executed by at least one processor associated with a smart feedback system (SFS). The SFS stores a plurality of user profiles, wherein each user profile is associated with a corresponding user and a corresponding personalized avatar.

At 302, a user of the plurality of users associated with a first interaction with the SFS from a first device at a first location remote from the SFS is identified. In some implementations, identifying the user of the plurality of users associated with the first interaction with the SFS from the first device further comprises: detecting, by the first device, the user using biometric recognition. From 302, method 300 proceeds to 304.

At 304, a first visualization of a personalized avatar associated with the user is provided to the first device based on a user profile associated with the user. From 304, method 300 proceeds to 306.

At 306, a first personalized feedback request is provided to the first device during the first visualization of the personalized avatar based on the user profile. The first personalized feedback request includes a first set of feedback requests associated with a first offer associated with a first participant of a plurality of participants. From 306, method 300 proceeds to 308.

At 308, first feedback of the user captured by the first device is received in response to the first personalized feedback request and associating the first feedback with the user profile. From 308, method 300 proceeds to 310.

At 310, the user associated with a second interaction with the SFS from a second device at the first location is identified. In some implementations, the first device is a smart display device associated with a retailer at the first location and the second device is a smart phone associated with the user at the first location. In some implementations, a location of the second device is determined by the first device based on a quick response (QR) code, an iBeacon, Bluetooth, and near-field communication (NFC). From 310, method 300 proceeds to 312.

At 312, a second visualization of the personalized avatar is provided to the second device. In some implementations, the first visualization of the personalized avatar has a similar appearance as the second visualization of the personalized avatar. From 312, method 300 proceeds to 314.

At 314, a second personalized feedback request is provided to the second device during the second visualization of the personalized avatar based on the user profile. The second personalized feedback request includes a second set of feedback requests associated with a second offer associated with a second participant of the plurality of participants. In some implementations, providing the first personalized feedback request to the first device is based on the user profile associated with the user, and providing the second personalized feedback request to the second device is based on the user profile. From 314, method 300 proceeds to 316. At 316, second feedback of the user captured by the second device is received in response to the second personalized feedback request and associating the second feedback with the user profile. In some implementations, providing a first recommendation to the first device during the first visualization of the personalized avatar is based on the user profile and an analysis of the first feedback of the user captured by the first device, and providing a second recommendation to the second device during the second visualization of the personalized avatar is based on the user profile and an analysis of the second feedback of the user captured by the second device. After 316, method 300 stops.

Figure 4:
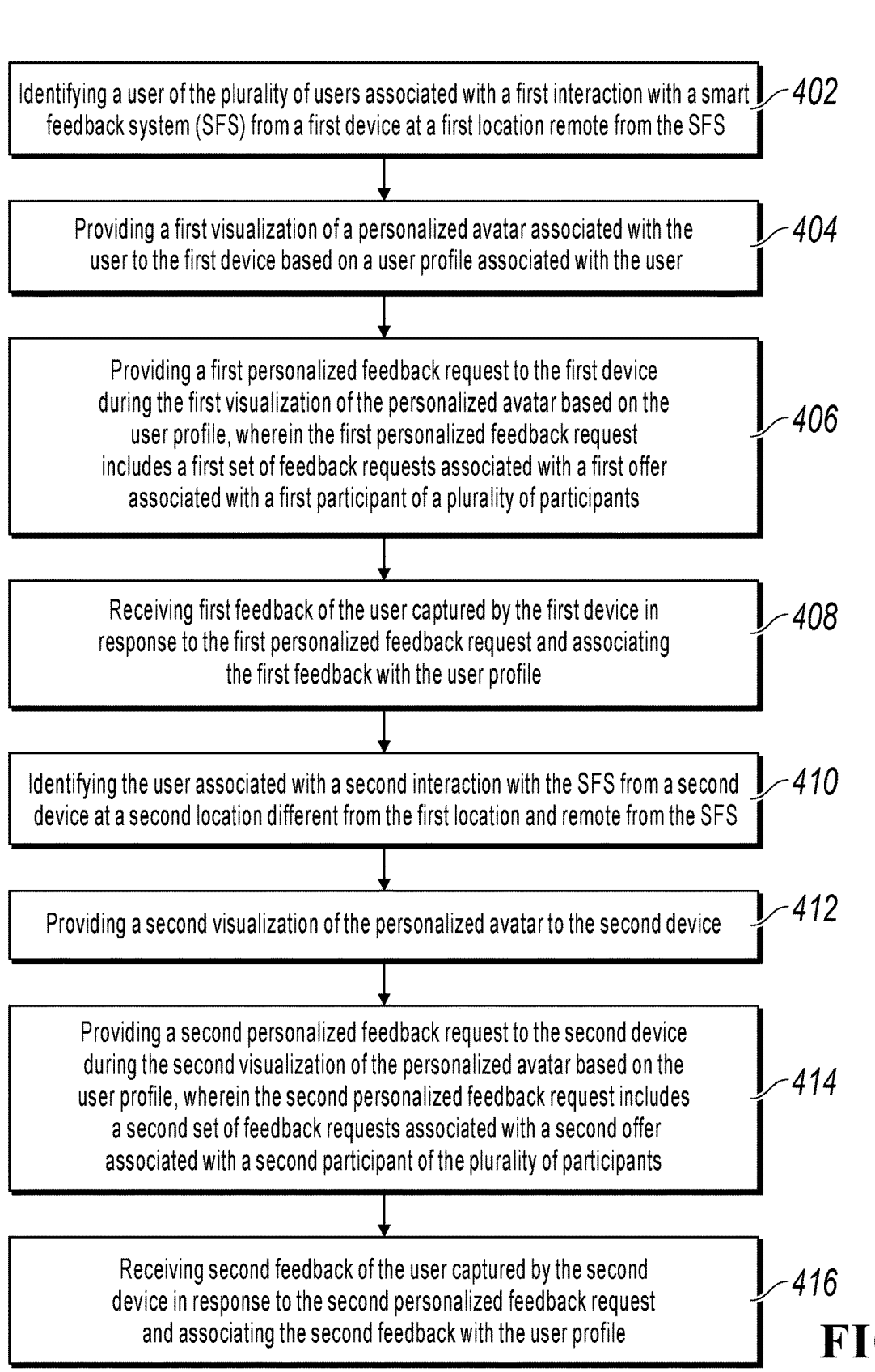
FIG. 4 is a flowchart illustrating another example of a computer-implemented method for providing a traveling avatar at two different devices at two different locations in a smart feedback system, according to an implementation of the present disclosure.

FIG. 4 is a flowchart illustrating an example of a computer-implemented method 400 for providing a traveling avatar in a smart feedback system, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

The method 400 is executed by at least one processor associated with a smart feedback system (SFS). The SFS stores a plurality of user profiles and a plurality of participant profiles. Each user profile of the plurality of user profiles is associated with a corresponding user of a plurality of users and a corresponding personalized avatar.

At 402, a user of the plurality of users associated with a first interaction with the SFS from a first device at a first location remote from the SFS is identified. In some implementations, identifying the user of the plurality of users associated with the first interaction with the SFS from the first device further comprises: detecting, by the first device, the user using biometric recognition. From 402, method 400 proceeds to 404.

At 404, a first visualization of a personalized avatar associated with the user is provided to the first device based on a user profile associated with the user. From 404, method 400 proceeds to 406.

At 406, a first personalized feedback request is provided to the first device during the first visualization of the personalized avatar based on the user profile. The first personalized feedback request includes a first set of feedback requests associated with a first offer associated with a first participant of a plurality of participants. From 406, method 400 proceeds to 408.

At 408, first feedback of the user captured by the first device is received in response to the first personalized feedback request and associating the first feedback with the user profile. From 408, method 400 proceeds to 410.

At 410, the user associated with a second interaction with the SFS from a second device at a second location different from the first location and remote from the SFS is identified. In some implementations, the first device is a smart display device associated with a first retailer at the first location of the first retailer and the second device is a smart display device associated with a second retailer at the second location of the second retailer. In some implementations, a location of the second device is determined by the first device based on a quick response (QR) code, an iBeacon, Bluetooth, and near-field communication (NFC). From 410, method 400 proceeds to 412.

At 412, a second visualization of the personalized avatar is provided to the second device. In some implementations, the first visualization of the personalized avatar has a similar appearance as the second visualization of the personalized avatar. From 412, method 400 proceeds to 414.

At 414, a second personalized feedback request is provided to the second device during the second visualization of the personalized avatar based on the user profile. The second personalized feedback request includes a second set of feedback requests associated with a second offer associated with a second participant of the plurality of participants. In some implementations, providing the first personalized feedback request to the first device is based on the user profile associated with the user, and providing the second personalized feedback request to the second device is based on the user profile. From 414, method 400 proceeds to 416. At 416, second feedback of the user captured by the second device is received in response to the second personalized feedback request and associating the second feedback with the user profile. In some implementations, providing a first recommendation to the first device during the first visualization of the personalized avatar is based on the user profile and an analysis of the first feedback of the user captured by the first device, and providing a second recommendation to the second device during the second visualization of the personalized avatar is based on the user profile and an analysis of the second feedback of the user captured by the second device. After 416, method 400 stops.

Figure 5:
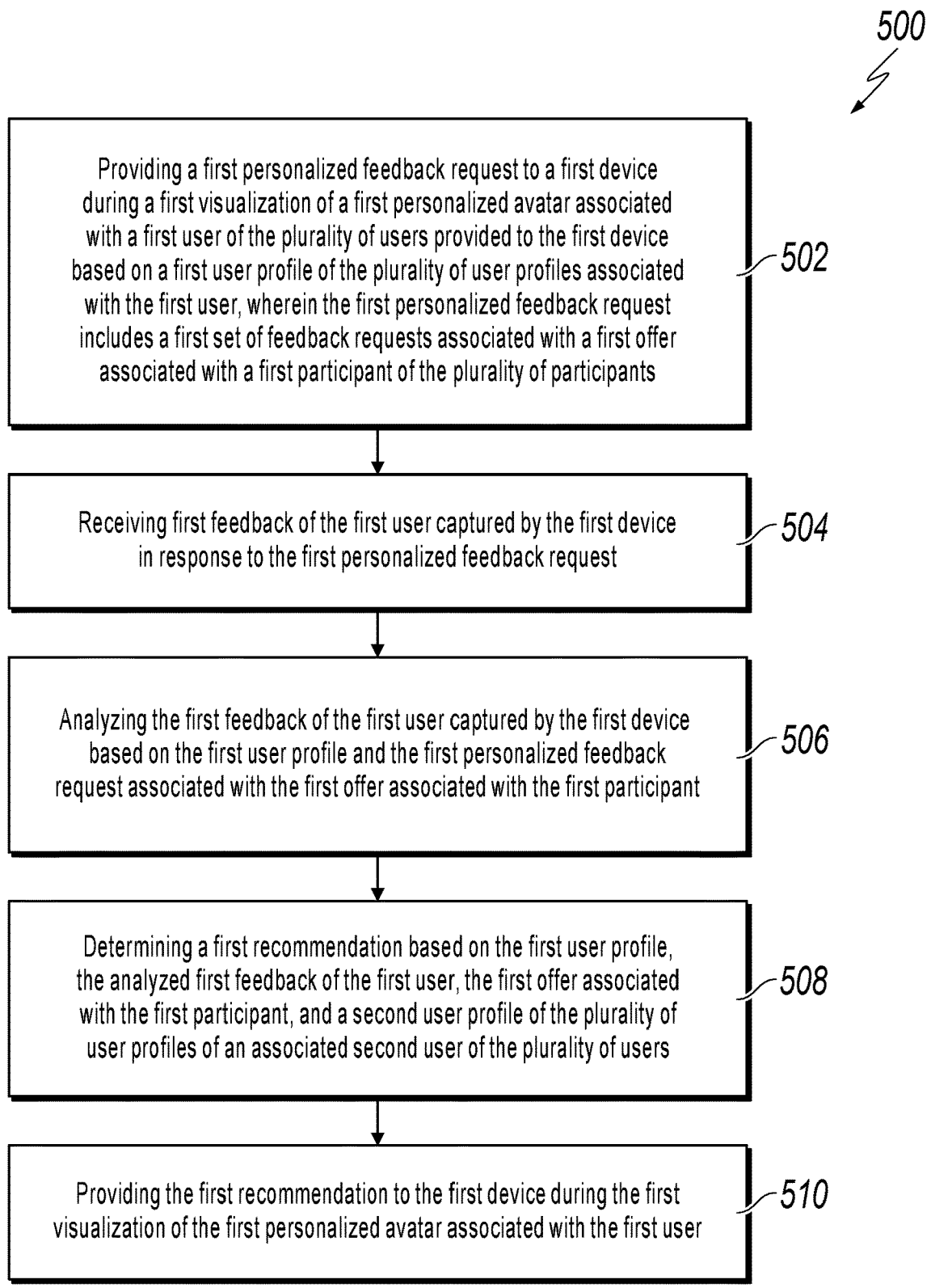
FIG. 5 is a flowchart illustrating an example of a computer-implemented method for providing user and multi-user smart feedback in a smart feedback system, according to an implementation of the present disclosure.

FIG. 5 is a flowchart illustrating an example of a computer-implemented method 500 for providing user and multi-user smart feedback in a smart feedback system, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

The method 500 is executed by at least one processor associated with a smart feedback system (SFS). The SFS stores a plurality of user profiles and a plurality of participant profiles. Each user profile is associated with a corresponding user from a plurality of users, as well as a corresponding personalized avatar. Each user profile comprises user information, device information, a set of interaction patterns, and a set of preferences. Each participant profile is associated with a corresponding participant. Each participant profile comprises participant information.

At 502, a first personalized feedback request is provided to a first device during a first visualization of a first personalized avatar associated with a first user of the plurality of users provided to the first device based on a first user profile of the plurality of user profiles associated with the first user. The first personalized feedback request includes a first set of feedback requests associated with a first offer associated with a first participant of the plurality of participants. From 502, method 500 proceeds to 504.

At 504, first feedback of the first user captured by the first device is received in response to the first personalized feedback request. From 504, method 500 proceeds to 506.

At 506, the first feedback of the first user captured by the first device is analyzed based on the first user profile and the first personalized feedback request associated with the first offer associated with the first participant. In some implementations, the first feedback of the first user captured by the first device comprises at least one of a tone of voice, a facial expression, a heart rate, an emotion, content of speech, a gesture, or content of a textual or written response. The analysis of the first feedback of the first user captured by the first device comprises mapping at least one of the tone of voice, the facial expression, the emotion, the content of speech, the gesture, or the content of the textual or written response to meaning using a machine learning algorithm based on the first personalized feedback request, and the set of interaction patterns and the set of preferences in the first user profile associated with the first user. In some implementations, the first user profile associated with the first user including the set of interaction patterns and the set of preferences in the first user profile is updated using a machine learning algorithm based on the first user profile, the analyzed first feedback of the first user, the first offer associated with the first participant, and the second user profile of the associated second user. In some implementations, the second user profile associated with the associated second user including the set of interaction patterns and the set of preferences in the second user profile is updated using a machine learning algorithm based on the first user profile, the analyzed first feedback of the first user, the first offer associated with the first participant, and the second user profile of the associated second user. From 506, method 500 proceeds to 508.

At 508, a first recommendation is determined based on the first user profile, the analyzed first feedback of the first user, the first offer associated with the first participant, and a second user profile of the plurality of user profiles of an associated second user of the plurality of users. In some implementations, prior to determining the first recommendation, that the associated second user is associated with the first user is determined based on one or more of friendship, relationship, or social connection (e.g., via social media) between the associated second user and the first user. In other instances, the determination may be based on a second offer similar to the first offer associated with the second user profile. From 508, method 500 proceeds to 510.

At 510, the first recommendation is provided to the first device during the first visualization of the first personalized avatar associated with the first user. In some implementations, a second recommendation is determined using a machine learning algorithm based on the first user profile, the analyzed first feedback of the first user, the first offer associated with the first participant, and the second user profile. The second recommendation is provided to a second device during a second visualization of a second personalized avatar associated with the associated second user based on the second user profile. In some implementations, a contextual and actionable response is determined using a machine learning algorithm based on the first user profile, the analyzed first feedback of the first user, the first offer associated with the first participant, the set of preferences in the first user profile and the second user profile of the associated second user. The determined contextual and actionable response is provided to the first device. After 510, method 500 stops.

Figure 6:
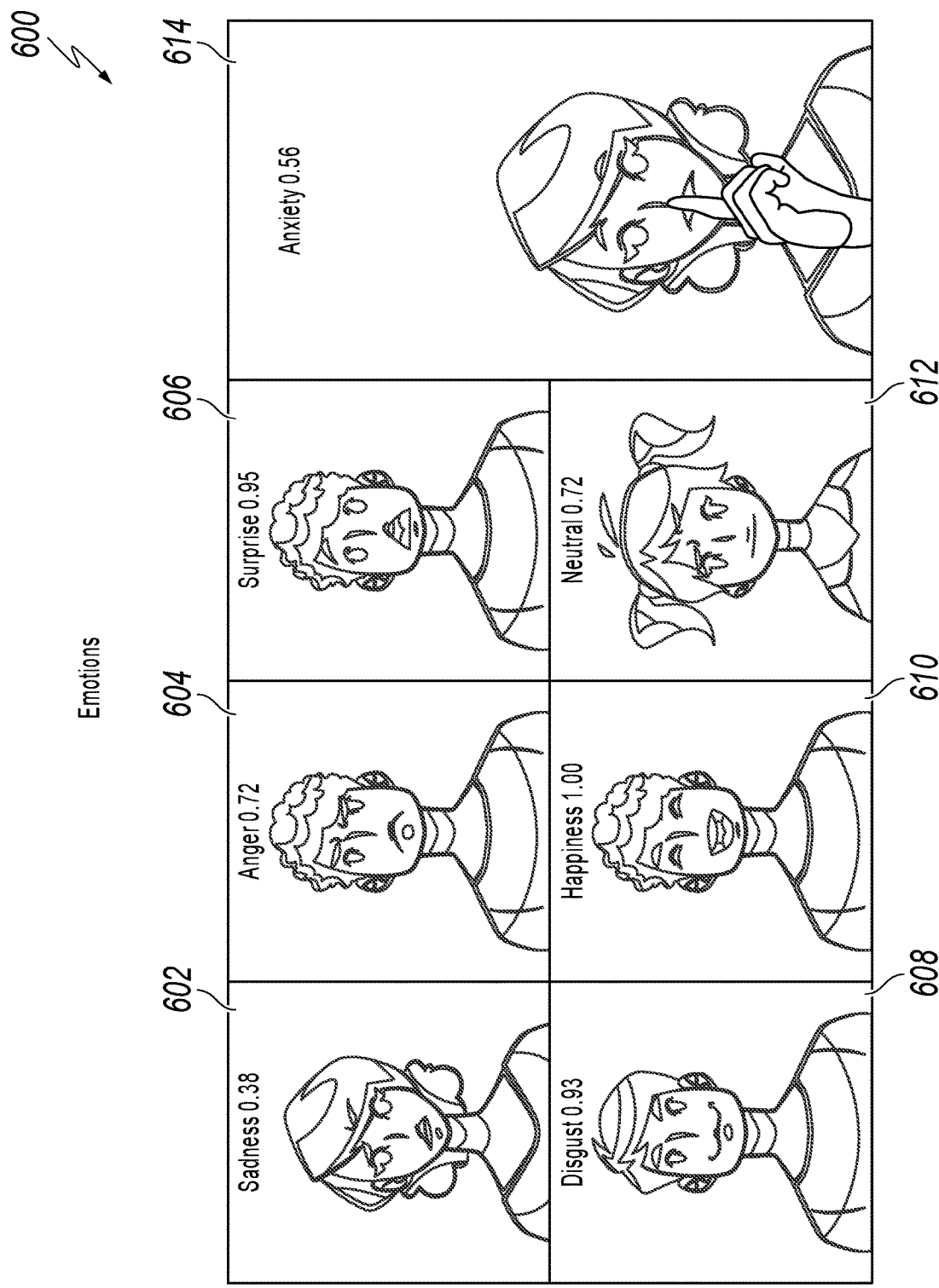
FIG. 6 is a conceptual diagram illustrating an example of facial emotion images of people expressing emotions for capturing emotions using facial emotion recognition, according to an implementation of the present disclosure.

FIG. 6 is a conceptual diagram illustrating an example of facial emotion images of people expressing emotions 600 for capturing emotions using facial emotion recognition, according to an implementation of the present disclosure. The illustrated facial emotion images of people expressing emotions 600 includes a facial emotion image of a person expressing sadness 602, a facial emotion image of a person expressing anger 604, a facial emotion image of a person expressing surprise 606, a facial emotion image of a person expressing disgust 608, a facial emotion image of a person expressing happiness 610, a facial emotion image of a person expressing a neutral emotion 612, and a facial emotion image of a person expressing anxiety 614. These facial emotion image of people expressing emotions 600 may be images or videos captured by a camera of a device and analyzed using facial emotion recognition, for example, mapping the facial emotion of a user to meaning using a machine learning algorithm.

Figure 7:
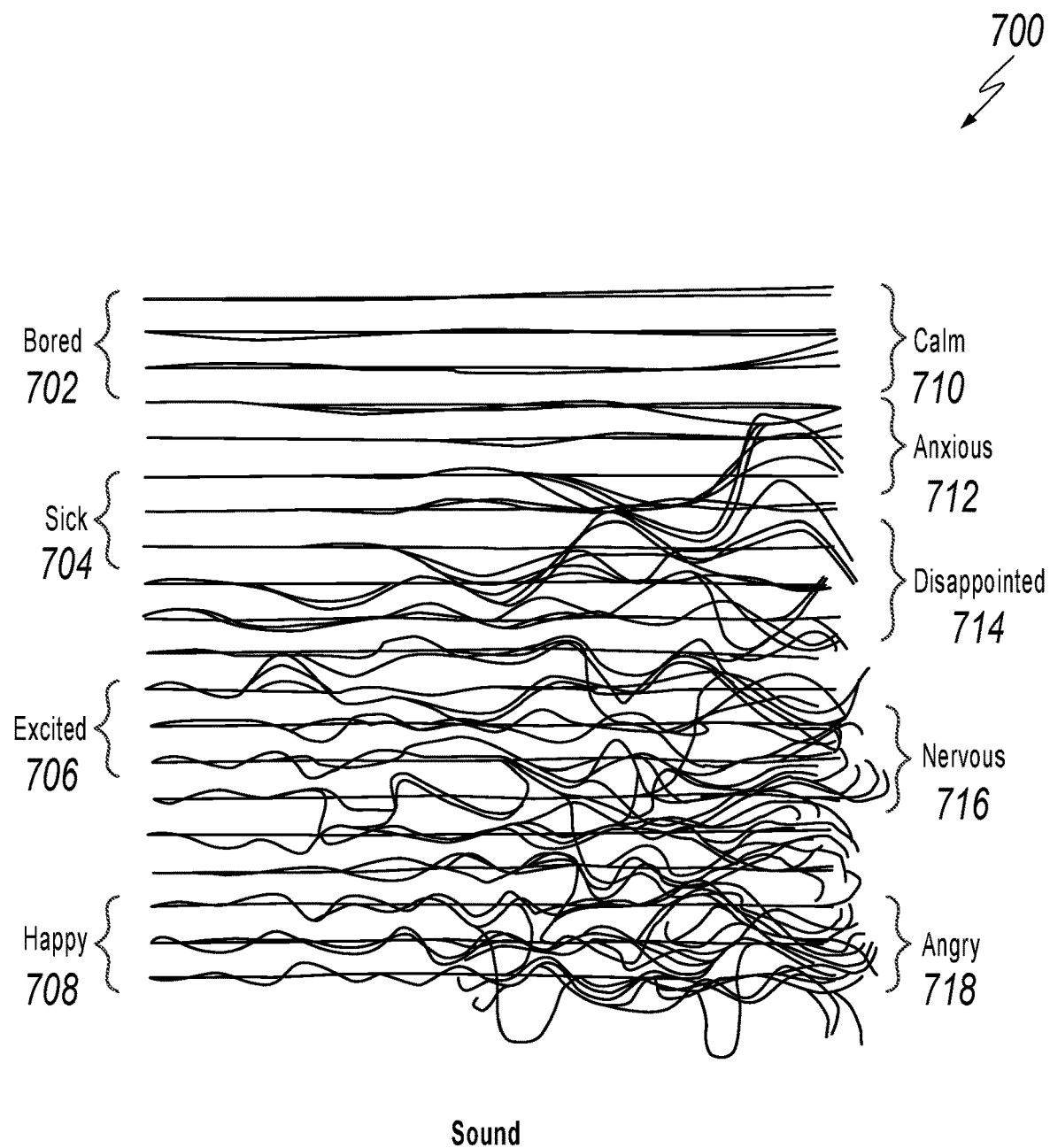
FIG. 7 is a conceptual diagram illustrating an example of audio vocal emotion data of a person expressing emotions for capturing emotions using audio vocal recognition, according to an implementation of the present disclosure.

FIG. 7 is a conceptual diagram illustrating an example of audio vocal emotion data of a person expressing emotions 700 for capturing emotions using audio vocal recognition, according to an implementation of the present disclosure. The illustrated audio vocal emotion data of a person expressing emotions 700 includes audio vocal emotion data of a bored person 702 expressing boredom, audio vocal emotion data of a sick person 704 expressing sickness, audio vocal emotion data of an excited person 706 expressing excitement, audio vocal emotion data of a happy person 708 expressing happiness, audio vocal emotion data of a calm person 710 expressing calmness, audio vocal emotion data of an anxious person 712 expressing anxiety, audio vocal emotion data of a disappointed person 714 expressing disappointment, audio vocal emotion data of a nervous person 716 expressing nervousness, and audio vocal emotion data of an angry person 718 expressing anger. These audio vocal emotion data of a person expressing emotions 700 may be audio of a voice captured by a microphone of a device and analyzed using audio vocal recognition, for example, mapping a tone of voice of a user to meaning using a machine learning algorithm.

Figure 8:
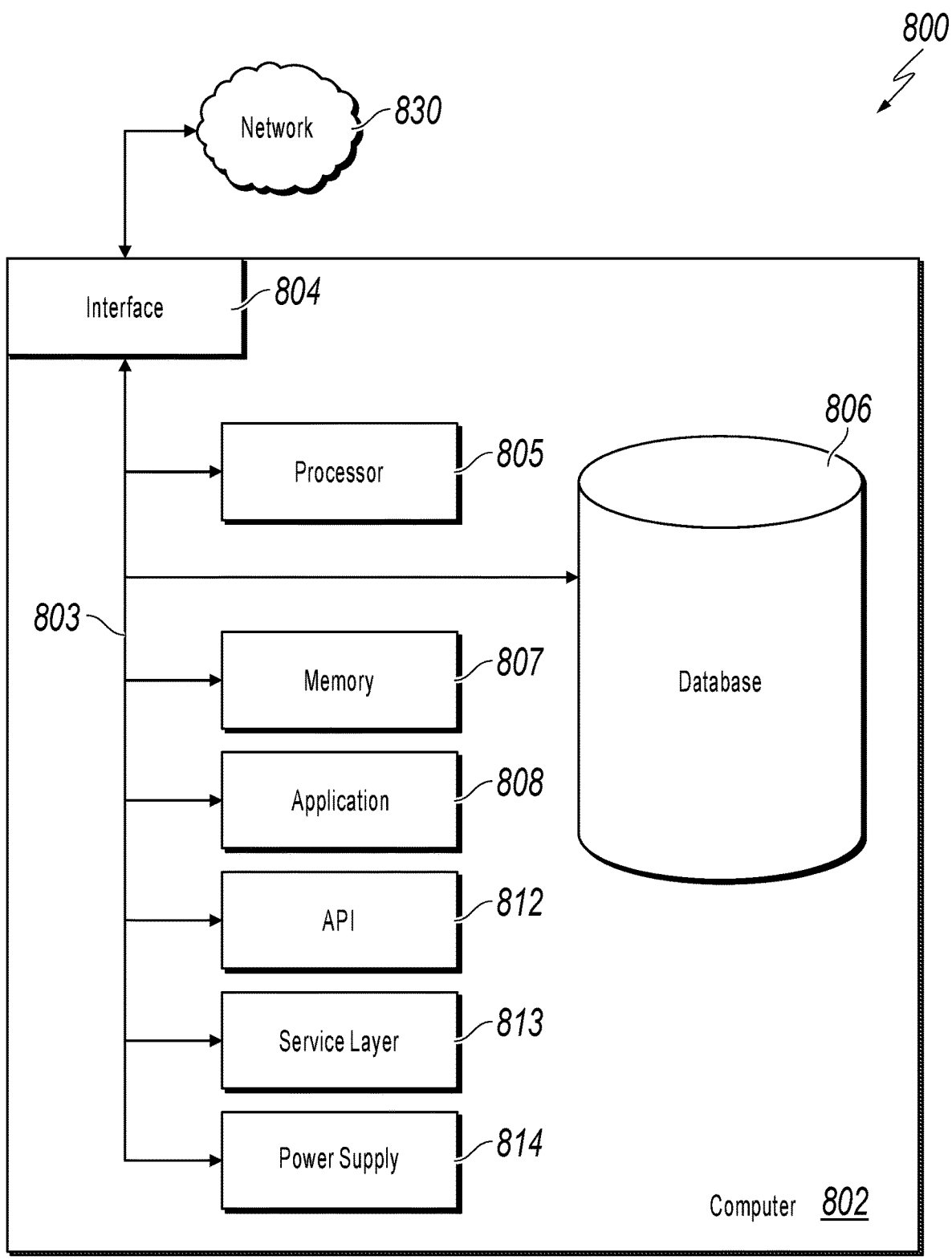
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented System 800 used to provide computational functionalities associated with described algorithms, methods, functions, processes, flows, and procedures, according to an implementation of the present disclosure. In the illustrated implementation, System 800 includes a Computer 802 and a Network 830.

The illustrated Computer 802 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 802 can include an input device, such as a keypad, keyboard, or touch screen, or a combination of input devices that can accept user information, and an output device that conveys information associated with the operation of the Computer 802, including digital data, visual, audio, another type of information, or a combination of types of information, on a graphical-type user interface (UI) (or GUI) or other UI.

The Computer 802 can serve in a role in a distributed computing system as, for example, a client, network component, a server, or a database or another persistency, or a combination of roles for performing the subject matter described in the present disclosure. The illustrated Computer 802 is communicably coupled with a Network 830. In some implementations, one or more components of the Computer 802 can be configured to operate within an environment, or a combination of environments, including cloud-computing, local, or global.

At a high level, the Computer 802 is an electronic computing device operable to receive, transmit, process, store, or manage data and information associated with the described subject matter. According to some implementations, the Computer 802 can also include or be communicably coupled with a server, such as an application server, e-mail server, web server, caching server, or streaming data server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory or conventional database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The Application 808 is an algorithmic software engine providing functionality according to particular needs, desires, or particular implementations of the Computer 802, particularly with respect to functionality described in the present disclosure. For example, Application 808 can serve as one or more components, modules, or applications. Further, although illustrated as a single Application 808, the Application 808 can be implemented as multiple Applications 808 on the Computer 802. In addition, although illustrated as integral to the Computer 802, in alternative implementations, the Application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

Described implementations of the subject matter can include one or more features, alone or in combination.

For example, in a first implementation, a computer-implemented method, the method being executed by at least one processor associated with a smart feedback system (SFS), wherein the SFS stores a plurality of user profiles, wherein each user profile is associated with a corresponding user and a corresponding personalized avatar, the method comprising: identifying a user of a plurality of users associated with a first interaction with the SFS from a first device at a first location remote from the SFS; providing a first visualization of a personalized avatar associated with the user to the first device based on a user profile associated with the user; providing a first personalized feedback request to the first device during the first visualization of the personalized avatar, wherein the first personalized feedback request includes a first set of feedback requests associated with a first offer associated with a first participant of a plurality of participants; receiving first feedback of the user captured by the first device in response to the first personalized feedback request and associating the first feedback with the user profile; identifying the user associated with a second interaction with the SFS from a second device at the first location; providing a second visualization of the personalized avatar to the second device; providing a second personalized feedback request to the second device during the second visualization of the personalized avatar, wherein the second personalized feedback request includes a second set of feedback requests associated with a second offer associated with a second participant of the plurality of participants; and receiving second feedback of the user captured by the second device in response to the second personalized feedback request and associating the second feedback with the user profile.

The foregoing and other described implementations can each, optionally, include one or more of the following features:

A first feature, combinable with any of the following features, wherein the first device is a smart display device associated with a retailer at the first location and the second device is a smart phone associated with the user at the first location.

A second feature, combinable with any of the previous or following features, wherein a location of the second device is determined by the first device based on a quick response (QR) code, an iBeacon, Bluetooth, and near-field communication (NFC).

A third feature, combinable with any of the previous or following features, wherein identifying the user of the plurality of users associated with the first interaction with the SFS from the first device further comprises: detecting, by the first device, the user using biometric recognition.

A fourth feature, combinable with any of the previous or following features, wherein providing the first personalized feedback request to the first device is based on the user profile associated with the user, and wherein providing the second personalized feedback request to the second device is based on the user profile.

A fifth feature, combinable with any of the previous or following features, wherein the first visualization of the personalized avatar has a similar appearance as the second visualization of the personalized avatar.

A sixth feature, combinable with any of the previous or following features, comprising: providing a first recommendation to the first device during the first visualization of the personalized avatar is based on the user profile and an analysis of the first feedback of the user captured by the first device; and providing a second recommendation to the second device during the second visualization of the personalized avatar is based on the user profile and an analysis of the second feedback of the user captured by the second device.

In a second implementation, a computer-implemented method, the method being executed by at least one processor associated with a smart feedback system (SFS), wherein the SFS stores a plurality of user profiles, wherein each user profile is associated with a corresponding user and a corresponding personalized avatar, the method comprising: identifying a user of a plurality of users associated with a first interaction with the SFS from a first device at a first location remote from the SFS; providing a first visualization of a personalized avatar associated with the user to the first device based on a user profile associated with the user; providing a first personalized feedback request to the first device during the first visualization of the personalized avatar, wherein the first personalized feedback request includes a first set of feedback requests associated with a first offer associated with a first participant of a plurality of participants; receiving first feedback of the user captured by the first device in response to the first personalized feedback request and associating the first feedback with the user profile; identifying the user associated with a second interaction with the SFS from a second device at a second location different from the first location and remote from the SFS; providing a second visualization of the personalized avatar to the second device; providing a second personalized feedback request to the second device during the second visualization of the personalized avatar, wherein the second personalized feedback request includes a second set of feedback requests associated with a second offer associated with a second participant of the plurality of participants; and receiving second feedback of the user captured by the second device in response to the second personalized feedback request and associating the second feedback with the user profile.

The foregoing and other described implementations can each, optionally, include one or more of the following features:

A first feature, combinable with any of the following features, wherein the first device is a smart display device associated with a first retailer at the first location of the first retailer and the second device is a smart display device associated with a second retailer at the second location of the second retailer.

A second feature, combinable with any of the previous or following features, wherein a location of the second device is determined by the first device based on a quick response (QR) code, an iBeacon, Bluetooth, and near-field communication (NFC).

A third feature, combinable with any of the previous or following features, wherein identifying the user of the plurality of users associated with the first interaction with the SFS from the first device further comprises: detecting, by the first device, the user using biometric recognition.

A fourth feature, combinable with any of the previous or following features, wherein providing the first personalized feedback request to the first device is based on the user profile associated with the user, and wherein providing the second personalized feedback request to the second device is based on the user profile.

A fifth feature, combinable with any of the previous or following features, wherein the first visualization of the personalized avatar has a similar appearance as the second visualization of the personalized avatar.

A sixth feature, combinable with any of the previous or following features, comprising: providing a first recommendation to the first device during the first visualization of the personalized avatar based on the user profile and an analysis of the first feedback of the user captured by the first device; and providing a second recommendation to the second device during the second visualization of the personalized avatar based on the user profile and an analysis of the second feedback of the user captured by the second device.

In a third implementation, a computer-implemented system, comprising: one or more computers associated with a smart feedback system (SFS), wherein the SFS stores a plurality of user profiles, wherein each user profile is associated with a corresponding user and a corresponding personalized avatar; and one or more computer memory devices interoperably coupled with the one or more computers and having tangible, non-transitory, machine-readable media storing one or more instructions that, when executed by the one or more computers, perform one or more operations comprising: identifying a user of a plurality of users associated with a first interaction with the SFS from a first device at a first location remote from the SFS; providing a first visualization of a personalized avatar associated with the user to the first device based on a user profile associated with the user; providing a first personalized feedback request to the first device during the first visualization of the personalized avatar, wherein the first personalized feedback request includes a first set of feedback requests associated with a first offer associated with a first participant of a plurality of participants; receiving first feedback of the user captured by the first device in response to the first personalized feedback request and associating the first feedback with the user profile; identifying the user associated with a second interaction with the SFS from a second device at the first location; providing a second visualization of the personalized avatar to the second device; providing a second personalized feedback request to the second device during the second visualization of the personalized avatar, wherein the second personalized feedback request includes a second set of feedback requests associated with a second offer associated with a second participant of the plurality of participants; and receiving second feedback of the user captured by the second device in response to the second personalized feedback request and associating the second feedback with the user profile.

The foregoing and other described implementations can each, optionally, include one or more of the following features:

A first feature, combinable with any of the following features, wherein the first device is a smart display device associated with a retailer at the first location and the second device is a smart phone associated with the user at the first location.

A second feature, combinable with any of the previous or following features, wherein a location of the second device is determined by the first device based on a quick response (QR) code, an iBeacon, Bluetooth, and near-field communication (NFC).

A third feature, combinable with any of the previous or following features, wherein identifying the user of the plurality of users associated with the first interaction with the SFS from the first device further comprises: detecting, by the first device, the user using biometric recognition.

A fourth feature, combinable with any of the previous or following features, wherein providing the first personalized feedback request to the first device is based on the user profile associated with the user, and wherein providing the second personalized feedback request to the second device is based on the user profile.

A fifth feature, combinable with any of the previous or following features, wherein the first visualization of the personalized avatar has a similar appearance as the second visualization of the personalized avatar.

In a fourth implementation, a computer-implemented method, the method being executed by at least one processor associated with a smart feedback system (SFS), wherein the SFS stores a plurality of user profiles and a plurality of participant profiles, wherein each user profile is associated with a corresponding user and a corresponding personalized avatar, wherein each user profile comprises user information, device information, a set of interaction patterns, and a set of preferences, wherein each participant profile is associated with a corresponding participant, and wherein each participant profile comprises participant information, and comprising: providing a first personalized feedback request to a first device during a first visualization of a first personalized avatar associated with a first user of the plurality of users provided to the first device based on a first user profile of the plurality of user profiles associated with the first user, wherein the first personalized feedback request includes a first set of feedback requests associated with a first offer associated with a first participant of the plurality of participants; receiving first feedback of the first user captured by the first device in response to the first personalized feedback request; analyzing the first feedback of the first user captured by the first device based on the first user profile and the first personalized feedback request associated with the first offer associated with the first participant; determining a first recommendation based on the first user profile, the analyzed first feedback of the first user, the first offer associated with the first participant, and a second user profile of the plurality of user profiles of an associated second user of the plurality of users; and providing the first recommendation to the first device during the first visualization of the first personalized avatar associated with the first user.

The foregoing and other described implementations can each, optionally, include one or more of the following features:

A first feature, combinable with any of the following features, comprising: determining a second recommendation using a machine learning algorithm based on the first user profile, the analyzed first feedback of the first user, the first offer associated with the first participant, and the second user profile; and providing the second recommendation to a second device during a second visualization of a second personalized avatar associated with the associated second user based on the second user profile.

A second feature, combinable with any of the previous or following features, comprising: prior to determining the first recommendation, determining that the associated second user is associated with the first user based on one or more of friendship between the associated second user and the first user or a second offer similar to the first offer associated with the second user profile.

A third feature, combinable with any of the previous or following features, comprising: updating the second user profile associated with the associated second user including the set of interaction patterns and the set of preferences in the second user profile using a machine learning algorithm based on the first user profile, the analyzed first feedback of the first user, the first offer associated with the first participant, and the second user profile of the associated second user.

A fourth feature, combinable with any of the previous or following features, comprising: updating the first user profile associated with the first user including the set of interaction patterns and the set of preferences in the first user profile using a machine learning algorithm based on the first user profile, the analyzed first feedback of the first user, the first offer associated with the first participant, and the second user profile of the associated second user.

A fifth feature, combinable with any of the previous or following features, wherein the first feedback of the first user captured by the first device comprises at least one of a tone of voice, a facial expression, a heart rate, an emotion, content of speech, a gesture, or content of a textual or written response, and wherein analyzing the first feedback of the first user captured by the first device comprises mapping at least one of the tone of voice, the facial expression, the emotion, the content of speech, the gesture, or content of a textual or written response to meaning using a machine learning algorithm based on the first personalized feedback request, and the set of interaction patterns and the set of preferences in the first user profile associated with the first user.

A sixth feature, combinable with any of the previous or following features, comprising: determining a contextual and actionable response using a machine learning algorithm based on the first user profile, the analyzed first feedback of the first user, the first offer associated with the first participant, the set of preferences in the first user profile and the second user profile of the associated second user; and providing the determined contextual and actionable response to the first device.

In a fifth implementation, a non-transitory, computer-readable medium storing one or more instructions executable by a computer system to perform operations, wherein the computer system associated with a smart feedback system (SFS), wherein the SFS stores a plurality of user profiles and a plurality of participant profiles, wherein each user profile is associated with a corresponding user and a corresponding personalized avatar, wherein each user profile comprises user information, device information, a set of interaction patterns, and a set of preferences, wherein each participant profile is associated with a corresponding participant, and wherein each participant profile comprises participant information, the operations comprising: providing a first personalized feedback request to a first device during a first visualization of a first personalized avatar associated with a first user of the plurality of users provided to the first device based on a first user profile of the plurality of user profiles associated with the first user, wherein the first personalized feedback request includes a first set of feedback requests associated with a first offer associated with a first participant of the plurality of participants; receiving first feedback of the first user captured by the first device in response to the first personalized feedback request; analyzing the first feedback of the first user captured by the first device based on the first user profile and the first personalized feedback request associated with the first offer associated with the first participant; determining a first recommendation based on the first user profile, the analyzed first feedback of the first user, the first offer associated with the first participant, and a second user profile of the plurality of user profiles of an associated second user of the plurality of users; and providing the first recommendation to the first device during the first visualization of the first personalized avatar associated with the first user.

The foregoing and other described implementations can each, optionally, include one or more of the following features:

A first feature, combinable with any of the following features, wherein the operations further comprising: determining a second recommendation using a machine learning algorithm based on the first user profile, the analyzed first feedback of the first user, the first offer associated with the first participant, and the second user profile; and providing the second recommendation to a second device during a second visualization of a second personalized avatar associated with the associated second user based on the second user profile.

A second feature, combinable with any of the previous or following features, wherein the operations further comprising: prior to determining the first recommendation, determining that the associated second user is associated with the first user based on one or more of friendship between the associated second user and the first user or a second offer similar to the first offer associated with the second user profile.

A third feature, combinable with any of the previous or following features, wherein the operations further comprising: updating the second user profile associated with the associated second user including the set of interaction patterns and the set of preferences in the second user profile using a machine learning algorithm based on the first user profile, the analyzed first feedback of the first user, the first offer associated with the first participant, and the second user profile of the associated second user.

A fourth feature, combinable with any of the previous or following features, wherein the operations further comprising: updating the first user profile associated with the first user including the set of interaction patterns and the set of preferences in the first user profile using a machine learning algorithm based on the first user profile, the analyzed first feedback of the first user, the first offer associated with the first participant, and the second user profile of the associated second user.

A fifth feature, combinable with any of the previous or following features, wherein the first feedback of the first user captured by the first device comprises at least one of a tone of voice, a facial expression, a heart rate, an emotion, content of speech, a gesture, or content of a textual or written response, and wherein analyzing the first feedback of the first user captured by the first device comprises mapping at least one of the tone of voice, the facial expression, the emotion, the content of speech, the gesture, or the content of the textual or written response to meaning using a machine learning algorithm based on the first personalized feedback request, and the set of interaction patterns and the set of preferences in the first user profile associated with the first user.

A sixth feature, combinable with any of the previous or following features, wherein the operations further comprising: determining a contextual and actionable response using a machine learning algorithm based on the first user profile, the analyzed first feedback of the first user, the first offer associated with the first participant, the set of preferences in the first user profile and the second user profile of the associated second user; and providing the determined contextual and actionable response to the first device.

In a sixth implementation, a computer-implemented system, comprising: one or more computers associated with a smart feedback system (SFS), wherein the SFS stores a plurality of user profiles and a plurality of participant profiles, wherein each user profile is associated with a corresponding user and a corresponding personalized avatar, wherein each user profile comprises user information, device information, a set of interaction patterns, and a set of preferences, wherein each participant profile is associated with a corresponding participant, and wherein each participant profile comprises participant information; and one or more computer memory devices interoperably coupled with the one or more computers and having tangible, non-transitory, machine-readable media storing one or more instructions that, when executed by the one or more computers, perform one or more operations comprising: providing a first personalized feedback request to a first device during a first visualization of a first personalized avatar associated with a first user of the plurality of users provided to the first device based on a first user profile of the plurality of user profiles associated with the first user, wherein the first personalized feedback request includes a first set of feedback requests associated with a first offer associated with a first participant of the plurality of participants; receiving first feedback of the first user captured by the first device in response to the first personalized feedback request; analyzing the first feedback of the first user captured by the first device based on the first user profile and the first personalized feedback request associated with the first offer associated with the first participant; determining a first recommendation based on the first user profile, the analyzed first feedback of the first user, the first offer associated with the first participant, and a second user profile of the plurality of user profiles of an associated second user of the plurality of users; and providing the first recommendation to the first device during the first visualization of the first personalized avatar associated with the first user.

The foregoing and other described implementations can each, optionally, include one or more of the following features:

A first feature, combinable with any of the following features, wherein the one or more operations further comprising: determining a second recommendation using a machine learning algorithm based on the first user profile, the analyzed first feedback of the first user, the first offer associated with the first participant, and the second user profile; and providing the second recommendation to a second device during a second visualization of a second personalized avatar associated with the associated second user based on the second user profile.

A second feature, combinable with any of the previous or following features, wherein the one or more operations further comprising: prior to determining the first recommendation, determining that the associated second user is associated with the first user based on one or more of friendship between the associated second user and the first user or a second offer similar to the first offer associated with the second user profile.

A third feature, combinable with any of the previous or following features, wherein the one or more operations further comprising: updating the second user profile associated with the associated second user including the set of interaction patterns and the set of preferences in the second user profile using a machine learning algorithm based on the first user profile, the analyzed first feedback of the first user, the first offer associated with the first participant, and the second user profile of the associated second user.

A fourth feature, combinable with any of the previous or following features, wherein the one or more operations further comprising: updating the first user profile associated with the first user including the set of interaction patterns and the set of preferences in the first user profile using a machine learning algorithm based on the first user profile, the analyzed first feedback of the first user, the first offer associated with the first participant, and the second user profile of the associated second user.

A fifth feature, combinable with any of the previous or following features, wherein the first feedback of the first user captured by the first device comprises at least one of a tone of voice, a facial expression, a heart rate, an emotion, content of speech, a gesture, or content of a textual or written response, and wherein analyzing the first feedback of the first user captured by the first device comprises mapping at least one of the tone of voice, the facial expression, the emotion, the content of speech, the gesture, or the content of the textual or written response to meaning using a machine learning algorithm based on the first personalized feedback request, and the set of interaction patterns and the set of preferences in the first user profile associated with the first user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, the method being executed by at least one processor associated with a smart feedback system (SFS), wherein the SFS stores a plurality of user profiles, wherein each user profile is associated with a corresponding user and a corresponding personalized avatar, the method comprising:

identifying, by the SFS, a user of a plurality of users associated with a first interaction with the SFS from a first device at a first location remote from the SFS, wherein the first device is a smart phone associated with the user at the first location;

providing a first visualization of a personalized avatar associated with and previously personalized by and for the user to the first device based on a user profile associated with the user;

providing a first personalized feedback request to the first device during the first visualization of the personalized avatar, wherein the first personalized feedback request includes a first set of feedback requests associated with a first offer associated with a first participant of a plurality of participants;

receiving first feedback of the user captured by the first device in response to the first personalized feedback request and associating the first feedback with the user profile;

identifying, by the at least one processor, the user associated with a second interaction with the SFS from a second device at the first location, based on detecting the first device in proximity to the second device, wherein the second device is different than the first device, and wherein a location of the first device is determined by the second device based on a quick response (QR) code, an iBeacon, Bluetooth, or near-field communication (NFC);
providing a second visualization of the personalized avatar to the second device;
providing a second personalized feedback request to the second device during the second visualization of the personalized avatar, wherein the second personalized feedback request includes a second set of feedback requests associated with a second offer associated with a second participant of the plurality of participants that is identified based on the first feedback captured by the first device in response to the first personalized feedback request; and
receiving second feedback of the user captured by the second device in response to the second personalized feedback request and associating the second feedback with the user profile.

2. The computer-implemented method of claim 1, wherein the second device is a smart display device associated with a retailer at the first location.

3. The computer-implemented method of claim 1, wherein identifying the user of the plurality of users associated with the first interaction with the SFS from the first device further comprises:
   detecting, by the first device, the user using biometric recognition.

4. The computer-implemented method of claim 1, wherein providing the first personalized feedback request to the first device is based on the user profile associated with the user, and wherein providing the second personalized feedback request to the second device is based on the user profile.

5. The computer-implemented method of claim 1, wherein the first visualization of the personalized avatar has a similar appearance as the second visualization of the personalized avatar.

6. The computer-implemented method of claim 1, comprising:
   providing a first recommendation to the first device during the first visualization of the personalized avatar is based on the user profile and an analysis of the first feedback of the user captured by the first device; and
   providing a second recommendation to the second device during the second visualization of the personalized avatar is based on the user profile and an analysis of the second feedback of the user captured by the second device.

7. The computer-implemented method of claim 1, wherein the first location includes the user's home.

8. A computer-implemented system, comprising:
   one or more computers associated with a smart feedback system (SFS), wherein the SFS stores a plurality of user profiles, wherein each user profile is associated with a corresponding user and a corresponding personalized avatar; and
   one or more computer memory devices interoperably coupled with the one or more computers and having tangible, non-transitory, machine-readable media storing one or more instructions that, when executed by the one or more computers, perform one or more operations comprising:
      identifying, by the SFS, a user of a plurality of users associated with a first interaction with the SFS from a first device at a first location remote from the SFS, wherein the first device is a smart phone associated with the user at the first location;
      providing a first visualization of a personalized avatar associated with and previously personalized by and for the user to the first device based on a user profile associated with the user;
      providing a first personalized feedback request to the first device during the first visualization of the personalized avatar, wherein the first personalized feedback request includes a first set of feedback requests associated with a first offer associated with a first participant of a plurality of participants;
      receiving first feedback of the user captured by the first device in response to the first personalized feedback request and associating the first feedback with the user profile;
      identifying the user associated with a second interaction with the SFS from a second device at the first location, based on detecting the first device in proximity to the second device, wherein the second device is different than the first device, and wherein a location of the first device is determined by the second device based on a quick response (OR) code, an iBeacon, Bluetooth, or near-field communication (NFC);
      providing a second visualization of the personalized avatar to the second device;
      providing a second personalized feedback request to the second device during the second visualization of the personalized avatar, wherein the second personalized feedback request includes a second set of feedback requests associated with a second offer associated with a second participant of the plurality of participants that is identified based on the first feedback captured by the first device in response to the first personalized feedback request; and
      receiving second feedback of the user captured by the second device in response to the second personalized feedback request and associating the second feedback with the user profile.

9. The computer-implemented system of claim 8, wherein the second device is a smart display device associated with a retailer at the first location.

10. The computer-implemented system of claim 8, wherein identifying the user of the plurality of users associated with the first interaction with the SFS from the first device further comprises:
    detecting, by the first device, the user using biometric recognition.

11. The computer-implemented system of claim 8, wherein providing the first personalized feedback request to the first device is based on the user profile associated with the user, and wherein providing the second personalized feedback request to the second device is based on the user profile.

12. The computer-implemented system of claim 8, wherein the first visualization of the personalized avatar has a similar appearance as the second visualization of the personalized avatar.

13. A computer program product encoded on a non-transitory storage medium, the product comprising non-transitory, computer readable instructions for causing one or more processors to perform operations comprising:
    identifying, from a plurality of stored user profiles, wherein each user profile is associated with a corresponding user and a corresponding personalized avatar, a user of a plurality of users associated with a first interaction with a smart feedback system (SFS) from a first device at a first location remote from the SFS, wherein the first device is a smart phone associated with the user at the first location;

providing a first visualization of a personalized avatar associated with and previously personalized by and for the user to the first device based on a user profile associated with the user;

providing a first personalized feedback request to the first device during the first visualization of the personalized avatar, wherein the first personalized feedback request includes a first set of feedback requests associated with a first offer associated with a first participant of a plurality of participants;

receiving first feedback of the user captured by the first device in response to the first personalized feedback request and associating the first feedback with the user profile;

identifying the user associated with a second interaction with the SFS from a second device at the first location, based on detecting the first device in proximity to the second device, wherein the second device is different than the first device, and wherein a location of the first device is determined by the second device based on a quick response (QR) code, an iBeacon, Bluetooth, or near-field communication (NFC);

providing a second visualization of the personalized avatar to the second device;

providing a second personalized feedback request to the second device during the second visualization of the personalized avatar, wherein the second personalized feedback request includes a second set of feedback requests associated with a second offer associated with a second participant of the plurality of participants that is identified based on the first feedback captured by the first device in response to the first personalized feedback request; and receiving second feedback of the user captured by the second device in response to the second personalized feedback request and associating the second feedback with the user profile.

14. The computer program product of claim 13, wherein the second device is a smart display device associated with a retailer at the first location.

15. The computer program product of claim 13, wherein identifying the user of the plurality of users associated with the first interaction with the SFS from the first device further comprises:
   detecting, by the first device, the user using biometric recognition.

16. The computer program product of claim 13, wherein providing the first personalized feedback request to the first device is based on the user profile associated with the user, and wherein providing the second personalized feedback request to the second device is based on the user profile.

17. The computer program product of claim 13, wherein the first visualization of the personalized avatar has a similar appearance as the second visualization of the personalized avatar.

18. The computer program product of claim 13, the operations further comprising
   providing a first recommendation to the first device during the first visualization of the personalized avatar is based on the user profile and an analysis of the first feedback of the user captured by the first device; and
   providing a second recommendation to the second device during the second visualization of the personalized avatar is based on the user profile and an analysis of the second feedback of the user captured by the second device.

* * * * *